United States Patent
Nakatoh et al.

(10) Patent No.: US 6,477,490 B2
(45) Date of Patent: Nov. 5, 2002

(54) AUDIO SIGNAL COMPRESSION METHOD, AUDIO SIGNAL COMPRESSION APPARATUS, SPEECH SIGNAL COMPRESSION METHOD, SPEECH SIGNAL COMPRESSION APPARATUS, SPEECH RECOGNITION METHOD, AND SPEECH RECOGNITION APPARATUS

(75) Inventors: Yoshihisa Nakatoh, Katano (JP); Takeshi Norimatsu, Kobe (JP); Mineo Tsushima, Katano (JP); Tomokazu Ishikawa, Toyonakashi (JP); Mitsuhiko Serikawa, Nishinomiya (JP); Taro Katayama, Toyonaka (JP); Junichi Nakahashi, Nara (JP); Yoriko Yagi, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/892,745

(22) Filed: Jun. 28, 2001

(65) Prior Publication Data

US 2001/0044727 A1 Nov. 22, 2001

Related U.S. Application Data

(62) Division of application No. 09/165,297, filed on Oct. 2, 1998, now Pat. No. 6,311,153.

(30) Foreign Application Priority Data

Oct. 3, 1997 (JP) .............................. 9-270945
Mar. 16, 1998 (JP) .......................... 10-065005

(51) Int. Cl.$^7$ ............................................. G10L 19/06
(52) U.S. Cl. .................... 704/200.1; 704/205; 704/216; 704/500
(58) Field of Search .............................. 704/200.1, 200, 704/222, 216, 217, 218, 224, 230, 500, 501, 502, 503, 504, 205

(56) References Cited

U.S. PATENT DOCUMENTS 5,384,891 A    1/1995   Asakawa et al.

(List continued on next page.)

FOREIGN PATENT DOCUMENTS

EP    0 673 013    9/1995

(List continued on next page.)

OTHER PUBLICATIONS

Laine et al., "Warped linear prediction (WLP) in speech and audio processing" 1994, IEEE, pp. 111–349–111352.

(List continued on next page.)

Primary Examiner—Richemond Dorvil
(74) Attorney, Agent, or Firm—Wenderoth, Lind & Ponack, L.L.P.

(57) ABSTRACT

An audio signal compression apparatus for compressively coding an input audio signal comprises a time-to-frequency transformation unit for transforming the input audio signal to a frequency domain signal; a spectrum envelope calculation unit for calculating a spectrum envelope having different resolutions for different frequencies, from the input audio signal, using a weighting function on frequency based on human auditory characteristics; a normalization unit for normalizing the frequency domain signal using the spectrum envelope to obtain a residual signal; a power normalization unit for normalizing the residual signal by the power; an auditory weighting calculation unit for calculating weighting coefficients on frequency, based on the spectrum of the input audio signal and human auditory characteristics; and a multi-stage quantization device having plural stages of vector quantizers connected in series, to which the normalized residual signal is input, and at least one of the vector quantizers quantizing the residual signal using the weighting coefficients. Therefore, a low frequency band, which is auditively important, can be analyzed with a higher frequency resolution as compared with a high frequency band, whereby efficient signal compression utilizing human auditory characteristics is realized.

26 Claims, 9 Drawing Sheets

U.S. PATENT DOCUMENTS

| | | | |
|---|---|---|---|
| 5,537,647 A | 7/1996 | Hermansky et al. | 704/211 |
| 5,613,035 A | 3/1997 | Kim | 704/229 |
| 5,666,465 A | 9/1997 | Ozawa | |
| 5,684,920 A | 11/1997 | Iwakami et al. | |
| 5,724,480 A | 3/1998 | Yamaura | |
| 5,864,794 A * | 1/1999 | Tasaki | 704/200.1 |
| 5,999,899 A * | 12/1999 | Robinson | 704/219 |
| 6,092,039 A * | 7/2000 | Zingher | 704/203 |

FOREIGN PATENT DOCUMENTS

| | | | | |
|---|---|---|---|---|
| JP | 04035527 | 2/1992 | | |
| JP | 4-264599 | 9/1992 | | |
| JP | 7-111462 | 4/1995 | | H03M/7/50 |
| JP | 7-160297 | 6/1995 | | |
| JP | 8-44399 | 2/1996 | | |
| JP | 8-123494 | 5/1996 | | |
| JP | 09230897 | 9/1997 | | |

OTHER PUBLICATIONS

Merwe et al., "Calculation of LPC–based cepstrum coefficients using mel–scale frequency warping" 1991, IEEE, pp. 17–21.

Deller, "Discrete–Time Processing of Speech Signals" 1987, Prentice–Hall, p. 236.

"Audio Coding by Frequency–Weighted Interleave Vector Quantization(TwinVQ)", Anthology of Lectured Papers of Acoustic Society, 1–P–1, pp. 339–340, 1994.

"Code–Excited Liner Prediction (CELP) High Quality Speech at Very Low Rates", Proc. ICASSP–85(Mar. 1985).

"Speech Recognition by Probability Model", Edited by Electronics Information and Communication Society, pp. 18–20.

"Digital Signal Processing of Speech and Audio Information", by Kiyohiro Sikano, Satosi Nakamura, Siro Ise, Shyokodo, pp. 10–16 and 39–40.

* cited by examiner

AUDIO SIGNAL COMPRESSION METHOD, AUDIO SIGNAL COMPRESSION APPARATUS, SPEECH SIGNAL COMPRESSION METHOD, SPEECH SIGNAL COMPRESSION APPARATUS, SPEECH RECOGNITION METHOD, AND SPEECH RECOGNITION APPARATUS

This is a Rule 1.53(b) Divisional Application of Ser. No. 09/165,297, Filed Oct. 2, 1998, issued as U.S. Pat. No. 6,311,153.

FIELD OF THE INVENTION

The present invention relates a method and an apparatus for compressing an audio signal obtained by transforming music into an electric signal, and a method and an apparatus for compressing a speech signal obtained by transforming speech into an electric signal, which are capable of compressing the audio signal or the speech signal more efficiently than conventional methods and apparatuses while maintaining a high sound quality, in particular, when compressing the audio signal or the speech signal using a weighting function on frequency based on human auditory characteristics, in order to enable information transmission of the audio signal or the speech signal by a transmission line of a small capacity and efficient storage of the audio signal or the speech signal into recording media.

The present invention further relates to a method and an apparatus for recognizing speech, which are capable of providing a higher recognition rate than conventional methods and apparatuses, in particular, when performing recognition using parameters having different resolutions for different frequencies, which parameters are obtained by a linear prediction coding analysis utilizing human auditory characteristics.

BACKGROUND OF THE INVENTION

There have been proposed a variety of audio signal compression methods of this type and, hereinafter, one example of those methods will be described, Initially, a time series of an input audio signal is transformed into a frequency characteristic signal sequence for each length of a specific period (frame) by MDCT (modified discrete cosine transform), FFT (fast Fourier transform) or the like. Further, the input audio signal is subjected to linear predictive analysis (LPC analysis), frame by frame, to extract LPC coefficients (linear predictive coefficients), LSP coefficients (line spectrum pair coefficients), PARCOR coefficients (partial auto-correlation coefficients) or the like, and an LPC spectrum envelop is obtained from these coefficients. Next, the frequency characteristic is flattened by dividing the calculated frequency characteristic signal sequence with the LPC spectrum envelope and normalizing it, and then the power is normalized using the maximum value or the mean value of the power.

In the following description, output coefficients at the power normalization are called "residual signals". Further, the flattened residual signals are vector-quantized using the spectrum envelope as a weight.

As an example of such audio signal compression method, there is TwinVQ (Iwagami, Moriya, Miki: "Audio Coding by Frequency-Weighted Interleave Vector Quantization (TwinVQ)" Anthology of Lectured Papars of Acoustic Society, 1-P-1, pp.3390–340, 1994).

Next, a speech signal compression method according to a prior art will be described.

First of all, a time series of an input speech signal is subjected to LPC analysis for each frame, whereby it is divided into LPC spectrum envelope components, such as LPC coefficients, LSP coefficients, or PARCOR coefficients, and residual signals, the frequency characteristic of which is flattened. The LPC spectrum envelope components are Scalar-quantized, and the flattened residual signals are quantized according to a previously prepared sound source code book, whereby the components and the signals are transformed into digital signals, respectively.

As an example of such speech signal compression method, there is CELP (M. R. Schroeder and B. S. Atal, "Code-excited Linear Prediction (CELP) High Quality Speech at Very Low Rates", Proc. ICASSP-85, March 1085).

Further, a speech recognition method according to a prior art will be described.

Generally, in a speech recognition apparatus, speech recognition is performed as follows. A standard model for each phoneme or word is formed in advance by using speech data as a base, and a parameter corresponding to a spectrum envelope is obtained from an input speech. Then, the similarity between the time series of the input speech and the standard model is calculated, and a phoneme or word corresponding to the standard model having the highest similarity is found. In this case, hidden Markov model (HMM) or the time series itself of a representative parameter is used as the standard model (Seiichi Nakagawa "Speech Recognition by Probability Model", Edited by Electronics Information and Communication Society, pp. 18–20.)

Conventionally, recognition is performed using, as a time series of a parameter obtained from an input speech, the following cepstrum coefficients: LPC cepstrum coefficients which are obtained by transforming a time series of an input speech into LPC coefficients for each length of a specific period (frame) by LPC analysis and then subjecting the resulting LPC coefficients to cepstrum transform ("Digital Signal Processing of Speech and Audio Information", by Kiyohiro Sikano, Satosi Nakamura, Siro Ise, Shyokodo, pp. 10–16), or cepstrum coefficients which are obtained by transforming an input speech into power spectrums for each length of a specific period (frame) by DFT or band pass filter bank and then subjecting the resulting power spectrums to cepstrum transformation.

In the prior art audio signal compression method, residual signals are obtained by dividing a frequency characteristic signal sequence calculated by MDCT or FFT with an LPC spectrum envelop, and normalizing the result.

On the other hand, in the prior art speech signal compression method, an input audio signal is separated into an LPC spectrum envelope calculated by LPC analysis and residual signals. The prior art audio signal compression method and the prior art speech signal compression method are similar in that spectrum envelop components are removed from the input signal by the standard LPC analysis, i.e., residual signals are obtained by normalizing (flattening) the input signal by the spectrum envelope. Therefore, if the performance of this LPC analysis is improved or the estimated precision of the spectrum envelop obtained by the LPC analysis is increased, it is possible to compress information more efficiently than the prior art methods while maintaining a high sound quality.

In the standard LPC analysis, an envelop is estimated with a frequency resolution of the same precision for each frequency band. Therefore, in order to increase the frequency resolution for a low frequency band which is auditively important, i.e., in order to obtain a spectrum envelop of a low frequency band precisely, the analysis order must be increased, resulting in increased amount of information.

Further, to increase the analysis order results in an unnecessary increase in resolution for a high frequency band which is not auditively very important. In this case, calculation of a spectrum envelop having a peak in a high frequency band might be required, thereby degrading the sound quality.

Furthermore, in the prior art audio signal compression method, when vector quantization is performed, weighting is carried out on the basis of a spectrum envelop alone. Therefore, efficient quantization utilizing human auditory characteristics is impossible in the standard LPC analysis.

In the prior art speech recognition method, if LPC cepstrum coefficients obtained by the standard LPC analysis are used for the recognition, sufficient recognition performance might not be done because the LPC analysis is not based on human auditory characteristics.

It is well known that the human hearing fundamentally has a tendency to regard low-band frequency components as important and regard high-band frequency components as less important than the low-band components.

There is proposed a recognition method based on such tendency wherein recognition is performed using mel-LPC coefficients which are obtained by subjecting the LPC cepstrum coefficients to mel-transformation ("Digital Signal Processing of Speech and Audio Information", by Kiyohiro Sikano, Satosi Nakamura, Siro Ise, Shyokodo, pp. 39–40). However, in the LPC analysis for producing LPC cepstrum coefficients, human auditory characteristics are not sufficiently considered and, therefore, low-band information which is auditively important is not sufficiently reflected in LPC mel-cepstrum coefficients obtained by subjecting the cepstrum coefficients to mel transformation.

Mel-frequency scale is a scale obtained from pitch perceptivity characteristics of human beings. It is well known that the pitch depends on the intensity of sound as well as the frequency. So, a pure sound of 100 Hz and 40 dB SPL is used as a reference sound of 1000 mel, and sounds perceived as double and half in pitch are measured by magnitude measurement or the like and decided as 2000 mel and 500 mel, respectively. However, since human auditory characteristics are not sufficiently considered in the LPC analysis for producing the LPC cepstrum coefficients as described above, improvement of the substantial recognition performance cannot be expected even if mel-transformation is performed.

Further, in the standard LPC analysis, a spectrum envelop is estimated with the same frequency resolution for each frequency band. Therefore, in order to increase the frequency resolution for a low frequency band which is auditively important, i.e., obtain a spectrum envelop of a low frequency band precisely, the analysis order must be increased, resulting in increased parameters and increased throughput for recognition. Furthermore, to increase the analysis order results in an unnecessary increase in resolution for a high frequency band and, thereby, the high frequency band may have an unnecessary feature, degrading the recognition performance.

There is another speech recognition method wherein speech recognition is performed using cepstrum coefficients or mel-cepstrum coefficients as parameters. In this method, however, the computational complexity of DFT or bandpass filter bank is rather high than those in the LPC analysis.

The present invention is made to solve the above-described problems, in view of the fact that the speech recognition performance can be improved by using the following coefficients: mel-LPC coefficients obtained as a result of an LPC analysis of improved performance, i.e., based on human auditory characteristics (hereinafter referred to as "mel-LPC analysis"); mel-PARCOR coefficients obtained from mel-LPC coefficients by a well-known method similar to the method of obtaining PARCOR coefficients from standard LPC coefficients; mel-LSP coefficients obtained from mel-LSP coefficients by a well-known method similar to the method of obtaining LSP coefficients from standard LPC coefficients; or mel-LPC cepstrum coefficients obtained by subjecting mel-LPC coefficients to cepstrum transformation.

To improve the audio or speech signal compression performance or the speech recognition performance using these mel-coefficients has conventionally been supposed, but it has never been actually carried out because of the enormous amount of computation.

In the prior arts, infinite operation is required to calculate these coefficients and, if the operation is limited, it brings errors. The inventors found, as the result of vigorous studies in view of the existing state, that there is a brand-new operation that can provide an operation equivalent to the infinite operation without any error, by only performing the new operation a prescribed number of times.

SUMMARY OF THE PRESENT INVENTION

It is an object of the present invention to provide an audio signal compression method, an audio signal compression apparatus, a speech signal compression method, a speech signal compression apparatus, a speech recognition method, and a speech recognition apparatus, which realize improvement of compression performance of audio and speech signals and improvement of speech recognition performance by performing weighting of frequency based on human auditory characteristics by using the new operation described above.

In other words, it is an object of the present invention to provide an audio signal compression method, an audio signal compression apparatus, a speech signal compression method, and a speech signal compression apparatus, which can compress audio or speech signals more efficiently than the prior art methods and apparatus while maintaining a high sound quality by improving the performance of LPC analysis using a spectrum envelop based on a weighting function of frequency adapted to human auditory characteristics or by increasing the precision in estimation of a spectrum envelop obtained by LPC analysis.

It is another object of the present invention to provide a speech recognition method and a speech recognition apparatus, which can recognize the feature of a spectrum envelope efficiently even with less parameters since parameters corresponding to the spectrum envelope are obtained by mel-LPC analysis using a weighting function of frequency based on human auditory characteristics, and realize high recognition performance with less processing amount than that of the prior art methods and apparatus, by using the parameters.

According to a first aspect of the present invention, an audio signal compression method for compressively coding an input audio signal includes the steps of: calculating a spectrum envelope having different resolutions for different frequencies, from the input audio signal, using a weighting function of frequency based on human auditory characteristics; and flattening the input audio signal for each frame using the calculated spectrum envelope.

According to a second aspect of the present invention, an audio signal compression method for compressively coding an input audio signal includes the steps of: transforming the input signal into a frequency-warped signal with an all-pass filter, using a weighting function of frequency based on human auditory characteristics; obtaining a spectrum envelope having different resolutions for different frequencies, by performing linear predictive analysis of the frequency-warped signal; and flattening the input audio signal for each frame using the spectrum envelope.

According to a third aspect of the present invention, an audio signal compression method for compressively coding an input audio signal includes the steps of: performing mel-linear predictive analysis including frequency warping in a prediction model, thereby obtaining a spectrum envelope having different resolutions for different frequencies, from the input audio signal, using a weighting function of frequency based on human auditory characteristics; and flattening the input audio signal for each frame using the spectrum envelope.

According to a fourth aspect of the present invention, there is provided an audio signal compression method for compressively coding an input audio signal, which method has the step of performing mel-linear predictive analysis including frequency warping in a prediction model, thereby calculating a spectrum envelope having different resolutions for different frequencies, from the input audio signal, using a weighting function of frequency based on human auditory characteristics. The mel-linear predictive analysis comprises the steps of: cutting out an input signal of a specific time length from the input audio signal, and filtering the signal of the time length using multiple stages of all-pass filters to obtain output signals from the respective filters; obtaining a correlation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i,j)$ is the correlation function, $x[n]$ is the input signal, and $y_{(i-j)}[n]$ is the output signal from each filter; obtaining mel-linear predictive coefficients from the correlation function on the mel-frequency axis; and using the mel-linear predictive coefficients as a spectrum envelope, or obtaining a spectrum envelope from the mel-linear predictive coefficients.

According to a fifth aspect of the present invention, an audio signal compression apparatus for compressively coding an input audio signal comprises: time-to-frequency transformation means for transforming the input audio signal to a frequency domain signal; spectrum envelope calculation means for calculating a spectrum envelope having different resolutions for different frequencies, from the input audio signal, using a weighting function of frequency based on human auditory characteristics; normalization means for normalizing the frequency domain signal with the spectrum envelope to obtain a residual signal; power normalization means for normalizing the residual signal with the power; auditory weighting calculation means for calculating weighting coefficients of frequency, based on the spectrum of the input audio signal and human auditory characteristics, and multi-stage quantization means having plural stages of vector quantizers connected in series, to which the normal- ized residual signal is input, and at least one of the vector quantizers quantizing the residual signal using the weighting coefficients.

According to a sixth aspect of the present invention, an audio signal compression apparatus for compressively coding an input audio signal comprises: mel-parameter calculation means for calculating mel-linear predictive coefficients on a mel-frequency axis which represents a spectrum envelope having different resolutions for different frequencies, from the input audio signal, using a weighting function of frequency based on human auditory characteristics; parameter transformation means for transforming the mel-linear predictive coefficients to parameters representing a spectrum envelope, such as linear predictive coefficients on a linear frequency axis; envelope normalization means for normalizing the input audio signal by inversely filtering it with the parameters representing the spectrum envelope, to obtain a residual signal; power normalization means for normalizing the residual signal using the maximum value or mean value of the power to obtain a normalized residual signal; and vector quantization means for vector-quantizing the normalized residual signal using a residual code book to transform the residual signal into residual codes.

According to a seventh aspect of the present invention, there is provided a speech signal compression method for compressively coding an input speech signal, which method has the step of performing mel-linear predictive analysis including frequency warping in a prediction model, thereby calculating a spectrum envelope having different resolutions for different frequencies, from the input speech signal, using a weighting function of frequency based on human auditory characteristics. The mel-linear predictive analysis comprises the steps of: cutting out an input signal of a specific time length from the input speech signal, and filtering the signal of the time length using multiple stages of all-pass filters to obtain output signals from the respective filters; obtaining a correlation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i,j)$ is the correlation function, $x[n]$ is the input signal, and $y_{(i-j)}[n]$ is the output signal from each filter; obtaining mel-linear predictive coefficients from the correlation function on the mel-frequency axis; and using the mel-linear predictive coefficients as a spectrum envelope, or obtaining a spectrum envelope from the mel-linear predictive coefficients.

According to an eighth aspect of the present invention, a speech signal compression apparatus for compressively coding an input audio signal comprises: mel-parameter calculation means for calculating mel-linear predictive coefficients on a mel-frequency axis which represents a spectrum envelope having different resolutions for different frequencies, from the input speech signal, using a weighting function of frequency based on human auditory characteristics; parameter transformation means for transforming the mel-linear predictive coefficients to parameters representing a spectrum envelope, such as linear predictive coefficients on a linear frequency axis; envelope normalization means for normalizing the input signal by inversely filtering it with the parameters representing the spectrum envelope, to obtain a residual signal; power normalization means for normalizing the residual signal using the maximum value or mean value of the power to obtain a normalized residual signal; and vector quantization means for vector-quantizing the normalized residual signal using a residual code book to transform the residual signal into residual codes.

According to a ninth aspect of the present invention, there is provided a speech recognition method wherein parameters corresponding to a spectrum envelope are calculated from an input speech, by a linear predictive analysis method for calculating a spectrum envelope having different resolutions for different frequencies, using a weighting function of frequency based on human auditory characteristics; and the input speech is recognized using the parameters.

According to a tenth aspect of the present invention, a speech recognition method includes a method for obtaining a spectrum envelope based on human auditory characteristics from an input speech, which method comprises the steps of: transforming the input speech into a frequency-warped speech signal using an all-pass filter; and subjecting the frequency-warped speech signal to linear predictive analysis to obtain parameters corresponding to a spectrum envelope having different resolutions for different frequencies, and the input speech is recognized using the parameters so obtained.

According to an eleventh aspect of the present invention, a speech recognition method employs a mel-linear predictive analysis method including frequency warping in a prediction model as a method for obtaining parameters corresponding to a spectrum envelope based on human auditory characteristics from an input speech, and recognizes the input speech using the parameters.

According to a twelfth aspect of the present invention, a speech recognition method employs the following steps as a method for obtaining parameters corresponding to a spectrum envelope based on human auditory characteristics from an input speech: cutting out an input signal of a specific time length from an input speech, and filtering the signal of the time length using multiple stages of all-pass filters to obtain output signals from the respective filters; obtaining a correlation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i, j)$ is the correlation function, $x[n]$ is the input signal, and $y_{(i-j)}[n]$ is the output signal from each filter; and obtaining mel-linear predictive coefficients from the correlation function on the mel-frequency axis; and the input speech is recognized using the mel-linear predictive coefficients, or cepstrum coefficients obtained from the mel-linear predictive coefficients.

According to a thirteenth aspect of the present invention, a speech recognition apparatus comprises: mel-linear predictive analysis means for calculating mel-linear predictive coefficients corresponding to a spectrum envelope having different resolutions for different frequencies, from an input speech, using a weighting function of frequency based on human auditory characteristics; cepstrum coefficient calculation means for calculating cepstrum coefficients from the mel-linear predictive coefficients obtained by the mel-linear predictive analysis means; and a speech recognition means for calculating distances between plural frames of the cepstrum coefficients and plural standard models or plural standard patterns, and deciding which one of the standard models or patterns is similar to the input speech.

DETAILED DESCRIPTION OF THE PREFERRED EMBODIMENTS

[Embodiment 1]

Figure 1:
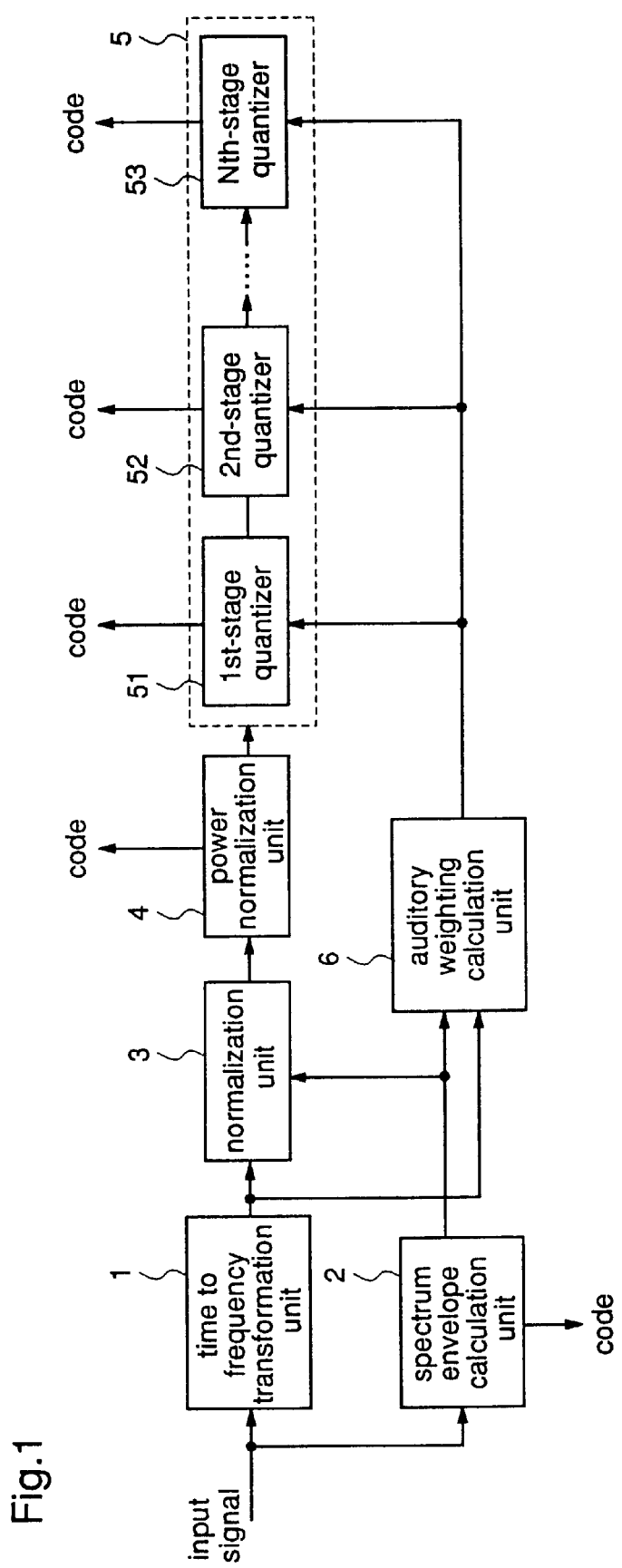
FIG. 1 is a block diagram illustrating the construction of an audio signal compression apparatus according to a first embodiment of the present invention.

FIG. 1 is a block diagram illustrating the construction of an audio signal compression apparatus according to a first embodiment of the present invention. In the figure, reference numeral 1 designates a time to frequency transformation unit for transforming a time series of an input digital audio signal or speech signal into a frequency characteristic signal sequence for each length of a specific period (frame) by MDCT, FFT, or the like. Reference numeral 2 designates a spectrum envelope calculation unit for obtaining, for each frame, a spectrum envelope having different resolutions for different frequencies, from the input audio signal, using mel-LPC analysis including a frequency warping function for a prediction model. Reference numeral 3 designates a normalization unit for normalizing the frequency characteristic signal sequence calculated by the time to frequency transformation unit 1 by dividing it with the spectrum envelope obtained by the spectrum envelope calculation unit 2 to flatten the frequency characteristic. Reference numeral 4 designates a power normalization unit for subjecting the frequency characteristic signal sequence flattened by the normalization unit 3 to power normalization based on value or mean value of the power. Reference numeral 5 designates a multi-stage quantization unit for vector-quantizing the frequency characteristic signal sequence flattened by the normalization unit 3 and the power normalization unit 4. The multi-stage quantization unit 5 comprises a first-stage quantizer 51, a second-stage quantizer 52, . . . , an $N_{th}$-stage quantizer 53 connected in series. Reference numeral 6 designates an auditory weighting calculation unit for receiving the frequency characteristic signal sequence output from the time to frequency transformation unit 1 and the spectrum envelope obtained in the spectrum envelope calculation unit 2, and obtaining weighting coefficients used for the quantization in the quantization unit 5, based on human auditory characteristics.

Next, the operation of the audio signal compression apparatus will be described. A time series of an input digital audio signal (hereinafter referred to simply as an input signal) is transformed to a frequency characteristic signal sequence, for each length of a specific period (frame), in the time to frequency transformation unit 1 by MDCT, FFT, or the like.

Further, from the input signal, a spectrum envelope having different resolutions for different frequencies is obtained in the spectrum envelope calculation unit, frame by frame, using mel-LPC analysis including frequency warping in a prediction model.

Figure 2:
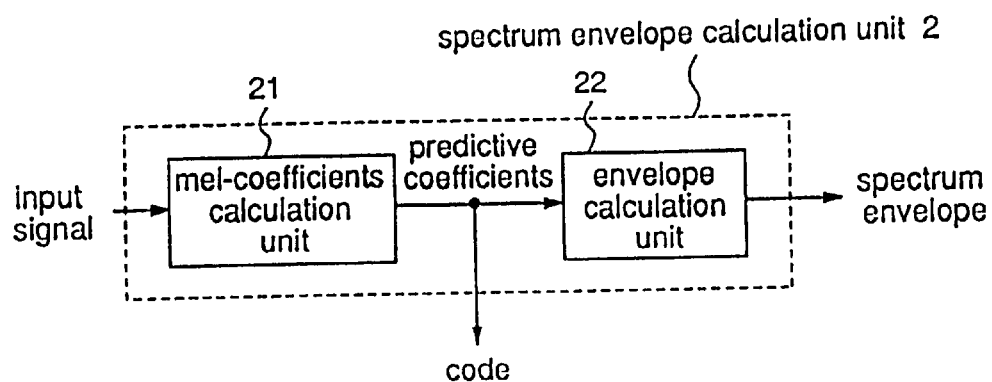
FIG. 2 is a block diagram illustrating the detailed construction of a spectrum envelope calculation unit included in the audio signal compression apparatus according to the first embodiment.

FIG. 2 illustrates the spectrum envelope calculation unit 2 for obtaining a spectrum envelope having different resolutions for different frequencies from the input signal by using the mel-LPC analysis. With reference to FIG. 2, the spectrum envelope calculation unit 2 includes a mel-coefficient calculation unit 21 for obtaining mel-transformed LPC coefficients, i.e., LPC coefficients having different resolutions for different frequencies, using the mel-LPC analysis. The calculation unit 2, further includes an envelope calculation unit 22 for calculating a spectrum envelope of a linear frequency that is used for spectrum flattening. Hereinafter the mel-coefficient calculation unit 21 and the envelope calculation unit 22 are explained.

Figure 3:
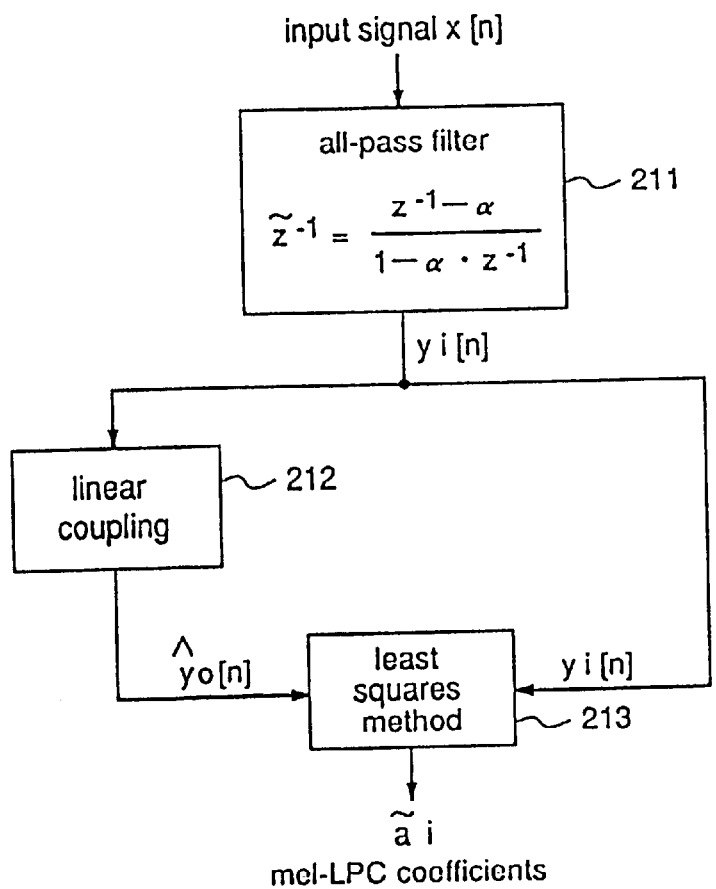
FIG. 3 is a block diagram illustrating the detailed construction of a mel-coefficient calculation unit included in the audio signal compression method according to the first embodiment.

FIG. 3 illustrates the outline of the process performed by the mel-coefficient calculation unit 21. In the FIG. 3, reference numeral 211 designates multiple stages of all-pass filters used for transforming the input signal into a frequency-warped signal. Reference numeral 212 designates a linear coupling unit for making linear coupling between output signals from the all-pass filters 211 and the predictive coefficients and then outputting predictors of the input signal. Reference numeral 213 designates a least square operation unit for outputting mel-LPC coefficients by applying a method of least square to the predictors output from the linear coupling unit 212 and to the signals output from the all-pass filters 211.

Next, a description is given of a method of estimating LPC coefficients having different resolutions for different frequencies, i.e., mel-LPC coefficients, with reference to FIG. 3.

Initially, an input signal x[n] is filtered using the i-th order all-pass filter $\tilde{z}^{-1}$ to obtain an output signal $y_i$[n], and this output signal $y_i$[n] is linearly coupled with a predictive coefficient—$\tilde{a}_1$, produced by the linear coupling unit 212, resulting in a predictor $\hat{y}_0$[n] of the input signal x[n], represented by the following formula (1).

$$\hat{y}_0[n] = -\{\tilde{a}_1 y_1[n] + \tilde{a}_2 y_2[n] + \cdots + \tilde{a}_p y_p[n]\} \quad (1)$$

wherein [n] indicates the numerical sequence on the time axis. The output signal $y_i$[n] is obtained from formulae (5) and (11) which are described later.

The all-pass filter $\tilde{z}^{-1}$ is represented as follows.

$$\tilde{z}^{-1} = \frac{z^{-1} - \alpha}{1 - \alpha \cdot z^{-1}} \quad (2)$$

wherein z is the operator of z transformation.

Figure 5:
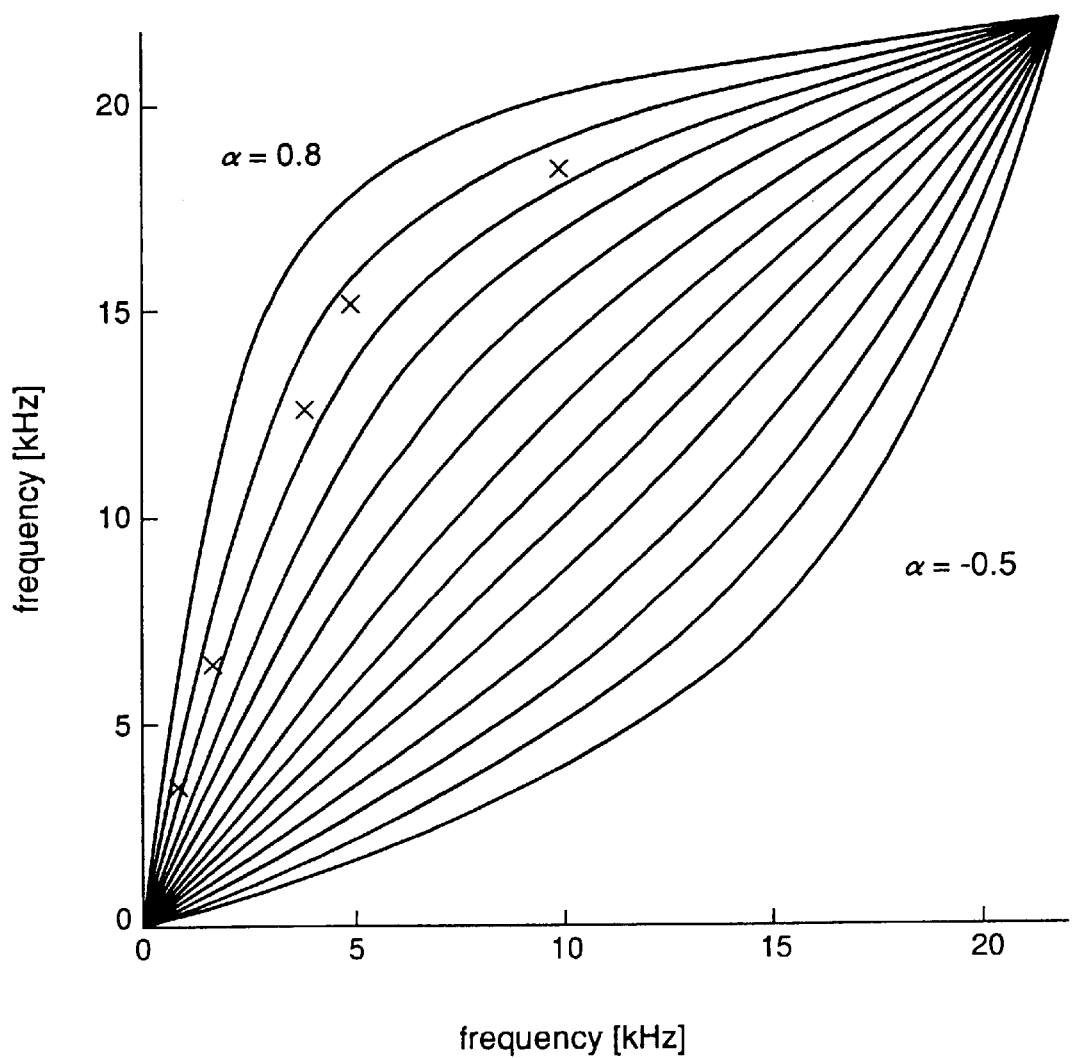
FIG. 5 is a diagram illustrating characteristics of frequency axis warping function (all-pass filter).

FIG. 5 illustrates frequency characteristics of the all-pass filters 211. In the figure, the abscissa shows a frequency axis before transformation, and the ordinate shows a frequency axis after transformation. This figure shows the state when the value of a is varied in a range from α=0.5 to α=0.8, in increments of 0.1. When the value of α is positive, low frequency bands are expanded and high frequency bands are reduced. On the other hand, when the value of α is negative, the relations are reversed.

According to the present invention, since audio signals or speech signals having different sampling frequencies, i.e., different band widths, are assumed as input signals, frequency resolutions adapted to human auditory characteristics are available when obtaining a spectrum envelope, by determining a value of α corresponding to each signal in accordance with the sampling frequency. For example, a bark-frequency scale is commonly known as a scale derived from measurement of a critical bandwidth relating to the auditory frequency resolution, and it is possible to determine the value of α according to this characteristic.

The bark-frequency scale is a scale based on the conception of an auditory filter proposed by Fletcher, and the auditory filter proposed by Fletcher is a band filter with a center frequency varying continuously. The band filter having a center frequency closest to a signal sound performs frequency analysis of the signal sound, and noise components affecting sound masking are limited to the frequency components within this band filter. Fletcher named the bandwidth of this band filter "a critical band".

Further, a mel-frequency scale is commonly known as a psychological scale which is obtained by directly quantizing the sense of pitch according to personal subjective point of view, and it is possible to determine the value of a according to this characteristic.

For example, when employing the mel-frequency scale as a weighting function of frequency based on human auditory characteristics, the inventors set the value of a as follows: α=0.31 for a sampling frequency of 8 kHz, α=0.35 for 10 kHz, α=0.41 for 12 kHz, α=0.45 for 16 kHz, and α=0.6~0.7 for 44.1 kHz. When employing the bark-frequency scale as a weighting function of frequency based on human auditory characteristics, the value of α may be changed as desired from the above-described values. For example, in the case of the bark-frequency scale, α=0.51 is employed for 12 kHz.

Next, to minimize a total square error ε between the output signal $y_i$[n] and the predictor $\hat{y}_0$[n], which error ε is expressed by the following formula (3), a coefficient $\tilde{a}_1$ is obtained in the least square operation unit 213 using the method of least square.

$$\varepsilon = \sum_{n=0}^{\infty}(y_0[n] - \hat{y}_0[n])^2 = \sum_{n=0}^{\infty}\left(\sum_{i=0}^{p}\tilde{a}_i y_i[n]\right)^2 \quad (3)$$

wherein p is the order of predictive coefficient. The value of p may be preexperimentally set considering the computational amount for the signal compression. When the input signal is a speech signal, the value may be set to 8~14, and when the input signal is an audio signal, the value may be set to 10~20.

However, $$a_0 = 1 \quad (4)$$

and $$y_0[n] = x[n] \quad (5)$$

The mel-LPC coefficient minimizing the total square error $\varepsilon$ of formula (3) is given by the following normal equation (6).

$$\sum_{j=1}^{p}\phi(i,j)\tilde{a}_j = -\phi(i,0) \quad (i=1,\cdots,p) \quad (6)$$

wherein the coefficient $\phi(i,j)$ is a correlation function (mel-autocorrelation function) on a mel-frequency axis (mel-frequency domain), and is expressed by the following formula (7).

$$\phi(i,j) = \sum_{n=0}^{\infty} y_i[n] y_j[n] \quad (7)$$

In this case, according to Parceval's theorem, the function $\phi(i,j)$ is related to the spectrum $X(e^{j\lambda})$ on the linear frequency axis by the following formula (8).

$$\phi(i,j) = \frac{1}{2\pi}\int_{-\pi}^{\pi}|X(e^{j\lambda})|^2\cos(i-j)\tilde{\lambda}d\lambda \quad (8)$$

wherein (i,j) indicates the numerical sequence in the frequency domain.

Further, formula (8) converted into a formula on the mel-frequency axis is as follows:

$$\phi(i,j) = \frac{1}{2\pi}\int_{-\pi}^{\pi}|\tilde{X}(e^{j\tilde{\lambda}})\tilde{W}(e^{j\tilde{\lambda}})|^2\cos(i-j)\tilde{\lambda}d\tilde{\lambda} = \tilde{r}_w[i-j] \quad (9)$$

however, $$\tilde{W}(\tilde{z}) = \frac{\sqrt{1-\alpha^2}}{1+\alpha \cdot \tilde{z}^{-1}} \quad (10)$$

Formula (9) is obtained by Fourier transformation of the all-pass filter shown by formula (2).

Formula (9) means that the mel-correlation function $\phi(i,j)$ is equal to the inverse Fourier transformation of the power spectrum on the mel-frequency axis. Therefore, the coefficient matrix of formula (6) becomes a Toeplits-type correlation matrix, and mel-LPC coefficients can be obtained by a simple recurrent formula.

Figure 4:
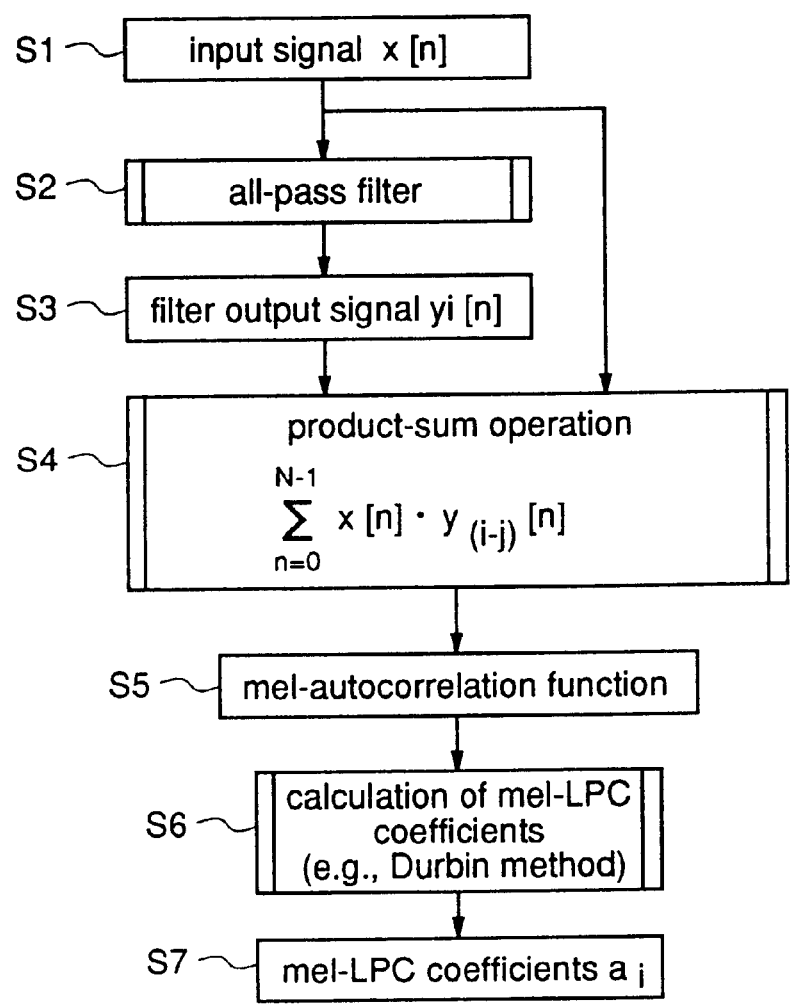
FIG. 4 is a block diagram for explaining a calculation procedure by the mel-coefficient calculation unit included in the audio signal compression apparatus according to the first embodiment.

Hereinafter a description is given of the procedure of a practical calculation for obtaining mel-LPC coefficients, the flow of which is shown in FIG. 4.

(Step 1)

An input signal x[n] is obtained in step S1, and the signal is filtered using the i-th order all-pass filter to obtain an output signal $y_i[n]$. In step S3, the output signal $y_i[n]$ is derived from the following formula (11).

$$y_i[n] = \alpha \cdot (y_i[n-1] - y_{i-1}[n]) + y_{(i-1)}[n-1] \quad (n=0,\ldots,N-1, i=1,\ldots,p) \quad (11)$$

However, $y_0[n] = x[n]$.

(Step 2)

In step S4, product-sum operation of the input signal x[n] and the filter output signal $y_i[n]$ is carried out, whereby a correlation function on the mel-frequency axis is obtained in Step S5. In this case, since the mel-correlation function $\phi(i,j)$ depends only on the difference in number of stages of the all-pass filters |i−j| because of the relation of formula (9), the mel-correlation function can be calculated by the product-sum operation of N-terms as shown in the following formula (12), so that approximation by terminating the operation is not required. Formula (12) is obtained by transforming formula (7) using formulae (5) and (11).

$$\phi(i,j) = \tilde{r}_w[i-j] = \sum_{n=0}^{N-1} x[n] \cdot y_{(i-j)}[n] \quad (12)$$

More specifically, it can be seen from formula (12) that the operation for obtaining the mel-correlation function, which requires an infinite number of calculations if calculated according to the ordinary calculation method shown in formula (7), can be completed by a finite number of calculations. Further, when terminating the operation in a finite number of calculations instead of performing an infinite number of calculations, any approximation such as cutting-off of waveform required for the termination is not needed, and there occurs no error accompanying the cutting-off of waveform. Furthermore, since the computational amount is only two times as much as that for the ordinary autocorrelation coefficients, it can be obtained directly from the waveform. This is an important point definitely different from the conventional calculation method shown in formula (7).

(Step 3)

In Step S6, the normal equation of formula (6) is solved using the mel-correlation function $\phi(i,j)$ by a conventionally known algorithm, for example, Durbin's method, whereby mel-LPC coefficients are obtained in step S7.

Figure 6:
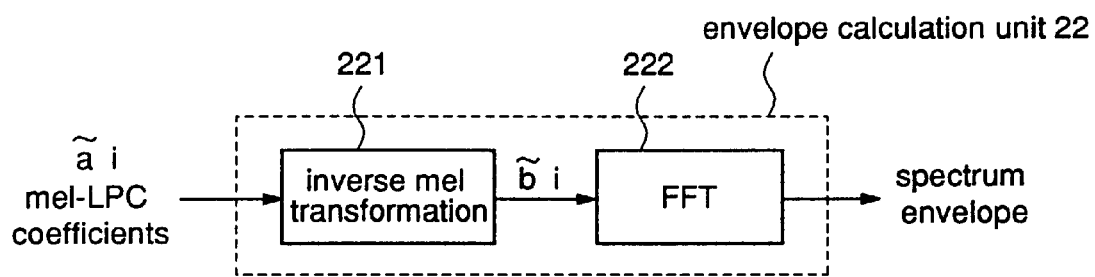
FIG. 6 is a block diagram illustrating the detailed construction of an envelope calculation unit included in the audio signal compression apparatus according to the first embodiment.

FIG. 6 shows the outline of the envelope calculation unit 22. In FIG. 6, reference numeral 221 designates an inverse mel-transformation unit for subjecting the mel-LPC coefficients to inverse mel-transformation and outputting LPC coefficients of a linear frequency. Reference numeral 222 designates an FFT unit for subjecting the LPC coefficients of the linear frequency to Fourier transform and outputting a spectrum envelope.

With reference to FIG. 6, a description is given of a method for obtaining a spectrum envelope of a linear frequency used for spectrum flattening, from the LPC coefficients having different resolutions for different frequencies, i.e., from the mel-LPC coefficients $\tilde{a}_i$.

First of all, in the inverse mel-transformation unit 221, an LPC coefficient $\tilde{b}_i$ of a linear frequency is obtained from the mel-LPC coefficient $\tilde{a}_i$, according to the following inverse mel-transformation.

$$\sum_{n=0}^{p} \tilde{a}_n z^{-n} = \sum_{n=0}^{\infty} \tilde{b}_n \tilde{z}^{-n} \qquad (13)$$

Formula 13 can be practically solved by calculating Oppenheim's recurrent formula which is well known. In formula (13), $\tilde{z}^{-1}$ indicates the all-pass filter, and this is expressed by the following formula (14). This all-pass filter is obtained by replacing $-\alpha$ in formula (2) with $+\alpha$.

$$\tilde{z}^{-1} = \frac{z^{-1} + \alpha}{1 + \alpha \cdot z^{-1}} \qquad (14)$$

Thereby, it is possible to obtain the predictive coefficients transformed from the mel-frequency to the linear frequency. Then, in the FFT unit 222, a linear-frequency spectrum envelope $S(e^{j\alpha})$ used for spectrum flattening is obtained from the linear-frequency LPC coefficient $\tilde{b}_1$, using FFT, as in the following formula (15).

$$S(e^{j\lambda}) = \frac{1}{\sum_{n=0}^{\infty} \tilde{b}_n e^{-j\lambda n}} \qquad (15)$$

Next, in the normalization unit 3, the frequency characteristic is flattened by dividing the calculated frequency characteristic signal sequence with the spectrum envelope for normalization. The frequency characteristic signal sequence flattened by the normalization unit 3 is subjected to power normalization in the power normalization unit 4, based on the maximum value or mean value of the power.

By the way, in speech signal compression, normalization with a spectrum envelope is performed in like manner as that performed by the normalization unit 3. To be specific, a time series of an input speech signal is subjected to LPC analysis for each frame and thereby separated into LPC spectrum envelope components such as LPC coefficients, LSP coefficients, or PARCOR coefficients, and residual signals having flattened frequency characteristic. That is, this process is equivalent to the division on frequency using the spectrum envelope components, and also equivalent to the inverse filtering on the time axis using the spectrum envelope components obtained by LPC analysis, such as LPC coefficients, LSP coefficients, or PARCOR coefficients.

Therefore, speech signal compression can be realized by performing the inverse filtering on time axis or separating the input signal into spectrum envelope components and residual signals, using the following coefficients: mel-LSP coefficients obtained from the input speech, mel-PARCOR coefficients obtained from the mel-LPC coefficients by the well-known method similar to the method of obtaining PARCOR coefficients from standard LPC coefficients, or mel-LSP coefficients obtained from the mel-LPC coefficients by the well-known method similar to the method of obtaining LSP coefficients from the standard LPC coefficients.

On the other hand, the frequency characteristic signal sequence output from the time to frequency transformation unit 1 and the spectrum envelope obtained in the spectrum envelope calculation unit 2 are input to the auditory weighting calculation unit 6. In the unit 6, characteristic signals of spectrum of the frequency characteristic signal sequence output from the time to frequency transformation unit 1 are calculated, based on human auditory characteristics such as minimum audible limit characteristics and auditory masking characteristics, and weighting coefficients used for quantization are obtained based on the characteristic signals and the spectrum envelope.

The residual signals output from the power normalization unit 4 are quantized in the first-stage quantizer 51 of the multi-stage quantization unit 5, using the weighting coefficients obtained by the auditory weighting calculation unit 6, and then the quantization error components obtained as the result of the quantization at the first-stage quantizer 51 are quantized in the second-stage quantizer 52, using the weighting coefficients obtained by the auditory weighting calculation unit 6. Thereafter, in each of the plural stages of quantizers, the quantization error components obtained by quantization in the previous stage are quantized. Each of the quantizers outputs codes as the result of quantization. When the quantization error components obtained by quantization in the (N−1) th-stage quantizer have been quantized in the Nth-stage quantizer 53 using the weighting coefficients obtained by the auditory weighting calculation unit 6, the compressive coding of the audio signal is completed.

As described above, according to the audio signal compression method and apparatus of this first embodiment, the normalization unit 3 normalizes a frequency characteristic signal sequence calculated from an input audio signal, using a spectrum envelope having different resolutions for different frequencies based on human auditory characteristics. Therefore, the frequency characteristic signal sequence can be flattened with precision, resulting in efficient quantization.

Further, the burden on the vector quantization in the multi-stage quantization unit 5 is reduced, resulting in efficient quantization. Since the frequency characteristic signal sequence is represented by limited information (codes) in the vector quantization, the frequency characteristic signal sequence having a simpler shape can be represented with less codes.

Therefore, in the present invention, in order to simplify the shape of the frequency characteristic signal sequence, normalization is performed using the spectrum envelope which represents the schematic shape of the frequency characteristic signal sequence. Moreover, since the spectrum envelope having different resolutions for different frequencies is used as the schematic shape, the shape of the frequency characteristic signal sequence can be simplified more precisely, resulting in efficient quantization.

Furthermore, the vector quantizers 51~53 of the multi-stage quantization unit 5 perform vector quantization using, as weights for quantization, the weighting coefficients of frequency which are calculated by the auditory weighting calculation unit 6, based on the spectrum of the input audio signal, human auditory characteristics, and the spectrum envelope having different resolutions for different frequencies based on the human auditory characteristics. Therefore, efficient quantization can be performed utilizing the human auditory characteristics.

In the mel-coefficient calculation unit 21, the LPC coefficients having different resolutions for different frequencies are obtained from the input signal by using the mel-LPC analysis, that is, the mel-LPC coefficients are obtained. However, the mel-LPC coefficients may be obtained by the following method. That is, the input signal is transformed into a frequency-warped signal by the all-pass filter, and the frequency-warped signal is subjected to the standard LPC analysis to obtain a spectrum envelope having different resolutions for different frequencies. Hereinafter, a description is given of a method for estimating LPC coefficients having different resolutions for different frequencies, i.e., mel-LPC coefficients.

Initially, an input signal x[n] is subjected to transformation from the frequency axis to the mel-frequency axis according to the following formula (16), thereby to obtain an output signal $\tilde{x}_i[n]$.

$$\sum_{n=0}^{N-1} x[n]z^{-n} = \sum_{n=0}^{\infty} \tilde{x}[n]\tilde{z}^{-n} \quad (16)$$

In the case, the all-pass filter $\tilde{z}^{-1}$ is represented by formula (2).

Next, this output signal $\tilde{x}_i[n]$ is subjected to the standard LPC analysis to obtain mel-LPC coefficients $\tilde{a}_i$, i.e., LPC coefficients having different resolutions for different frequencies.

Actually, formula (16) can be solved by calculating the well-known Oppenheim's recurrent formula. The mel-coefficient calculation unit 21 may use the LPC coefficients having different resolutions for different frequencies obtained in such a method.

Further, although the spectrum envelope calculation unit 2 obtains a spectrum envelope having different resolutions for different frequencies, from an input signal, by directly warping the input signal using the all-pass filter, the unit 2 may obtain such a spectrum envelope by another method in which the power spectrum of the input signal is resampled on the frequency axis, i.e., subjected to interpolation, to obtain a power spectrum with a warped frequency-axis, i.e., a mel-transformed power spectrum, and then the obtained power spectrum is subjected to inverse-DFT to obtain the spectrum envelope.

Furthermore, the spectrum envelope calculation unit 2 can obtain an autocorrelation function with a warped frequency-axis by filtering an autocorrelation function obtained from an input signal using multiple stages of all-pass filters, and then obtain a spectrum envelope having different resolutions for different frequencies from the resultant autocorrelation function.

In the audio signal compression apparatus of FIG. 1, although the auditory weighting calculation unit 6 uses a spectrum envelope for calculating weighting coefficients, this unit 6 may calculate weighting coefficients using only the spectrum of the input audio signal and human auditory characteristics.

Furthermore, in the audio signal compression apparatus of FIG. 1, all of the vector quantizers of the multi-stage quantization unit 5 perform quantization using the weighting coefficients based on human auditory characteristics which are obtained in the auditory weighting calculation unit 6. However, so long as one of the vector quantizers performs quantization using the weighting coefficients based on human auditory characteristics, more efficient quantization can be realized than in the case of not using such weighting coefficients based on human auditory-characteristics.

Although it is described that a signal to be compressed by the audio signal compression apparatus of FIG. 1 is a signal within an audio band, it may be a signal within a speech band and, in this case, the apparatus of FIG. 1 can be used as a speech signal compression apparatus without any modification.

Although the audio signal compression apparatus of FIG. 1 uses the mel-frequency scale as a weighting function of frequency based on human auditory characteristics, this apparatus can be changed into an audio signal compression apparatus performing signal compression based on a bark-frequency scale without changing the block structure of FIG. 1, only by adaptively changing the value of α of the all-pass filter.

[Embodiment 2]

Figure 7:
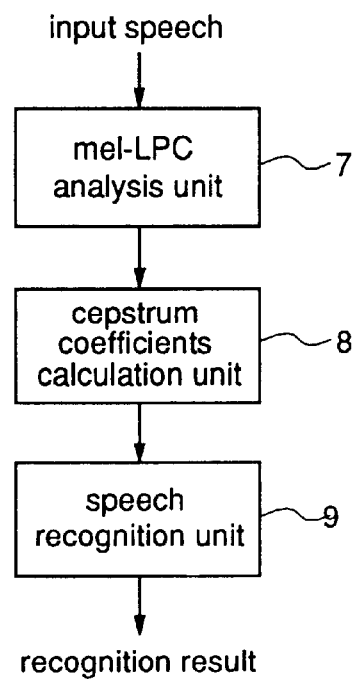
FIG. 7 is a block diagram illustrating the construction of a speech recognition apparatus according to a second embodiment of the present invention.

FIG. 7 is a block diagram illustrating the construction of a speech recognition apparatus according to a second embodiment of the present invention. In the figure, reference numeral 7 designates a mel-LPC analysis unit for calculating mel-LPC coefficients having different resolutions for different frequencies, from an input speech, frame by frame, using a mel predictive filter including frequency warping in a predication model. Reference numeral 8 designates a cepstrum coefficient calculation unit for transforming the mel-LPC coefficients calculated in the mel-LPC analysis unit 7 into cepstrum coefficients. Reference numeral 9 designates a speech recognition unit for calculating similarities between the time series of cepstrum coefficients calculated in the cepstrum coefficient calculation unit 8 and plural standard models or patterns such as words or phonemes which are prepared in advance, and recognizing the words or phonemes having the largest similarities. The speech recognition unit 9 can be used for either specific speaker recognition or non-specific speaker recognition.

Next, the operation of the speech recognition apparatus will be described in detail. First of all, from a time series of an input digital speech (hereinafter also referred to as an input signal), mel-LPC coefficients corresponding to a spectrum envelope having different resolutions for different frequencies are obtained for each length of a specific period (frame), using mel-LPC analysis including frequency warping in a prediction model. Now the operation of the mel-LPC analysis unit 7 will be described.

FIG. 7 schematically shows the mel-LPC analysis unit 7. A description is given of a method for calculating LPC coefficients having different resolutions for different frequencies, i.e., mel-LPC coefficients. In this second embodiment, employed as a predictive model is a model in which a unit delay $z^{-1}$ is replaced with a 1st-order all-pass filter represented by $$\tilde{z}^{-1} = \frac{z^{-1} - \alpha}{1 - \alpha \cdot z^{-1}} \quad (17)$$

and this model is represented as follows.

$$A(z) = \tilde{A}(\tilde{z}) = \sum_{n=1}^{p} \tilde{a}_n \tilde{z}^{-n} \quad (18)$$

wherein $\tilde{a}_i$, is the mel-LPC coefficient, and α is the warping coefficient for changing the resolution of the LPC analysis for each frequency. The frequency characteristics of the all-pass filter are shown in FIG. 5. For example, the warping coefficient α=0.31 for a sampling frequency of 8 kHz, α=0.35 for 10 kHz, α=0.41 for 12 kHz, α=0.45 for 16 kHz, and α=0.6~0.7 for 44.1 kHz.

It is now assumed that the predictive error for a finite-length waveform x[n] (n=0, . . . ,N−1) having a length of N is evaluated using a total square predictive error ranging over infinite time interval, such as $$\sigma^2 = \sum_{n=0}^{\infty} (y_0[n] - \hat{y}_0[n])^2 \quad (19)$$

In this case, assuming that $y_O[n]=x[n]$ and $y_i[n]$ is an output waveform obtained by filtering the input signal x[n] using the i-th order all-pass filter, a predictor $\hat{y}_0[n]$ of $y_i[n]$ is represented in a form of linear coupling as follows.

$$\hat{y}_0[n] = \sum_{n=1}^{p} \tilde{a}_n \cdot y_i[n] \quad (20)$$

Thereby, the coefficient $\tilde{a}_i$ having the minimum predictive error is derived from the following simultaneous equation.

$$\sum_{j=0}^{p} \phi_{ij} \tilde{a}_j = \phi_{i0} \quad (i = 1, \cdots, p) \quad (21)$$

wherein $\phi_{ij}$ is a covariance of $y_i[n]$ and $y_j[n]$. By using Parceval's theorem and the representation on the frequency axis of the all-pass filter $\tilde{z}^{-1}$ subjected to Fourier transformation, $\phi_{ij}$ is obtained by a finite product-sum operation as in the following.

$$\phi_{ij} = \sum_{n=0}^{\infty} y_i[n] y_j[n] = \sum_{n=0}^{N-1} y_0[n] y_{|i-j|}[n] \quad (22)$$

Further, when $\phi_{ij}=r[i-j]$, $r[m]$ can have a property of an autocorrelation function, thereby the stability of $1/(1-\tilde{A}(\tilde{z}))$ is secured.

As can be seen from formula (22), this operation has to be performed at an infinite number of times according to the normal calculation technique shown in the middle of formula (22), but the operation can be completed by a finite number of calculations shown at the right part of formula (22), not requiring massive computational amount. Further, any approximation necessary for terminating the operation after a finite number of calculations instead of performing an infinite number of calculations, such as cutting off of waveform, is not needed, and no error accompanying the cutting off of waveform occurs. Furthermore, since the computational amount is just several times as much as the normal computational amount for autocorrelation coefficients, it is possible to obtain the coefficients directly from the waveform. This is an important point definitely different from the conventional calculation method.

Figure 8:
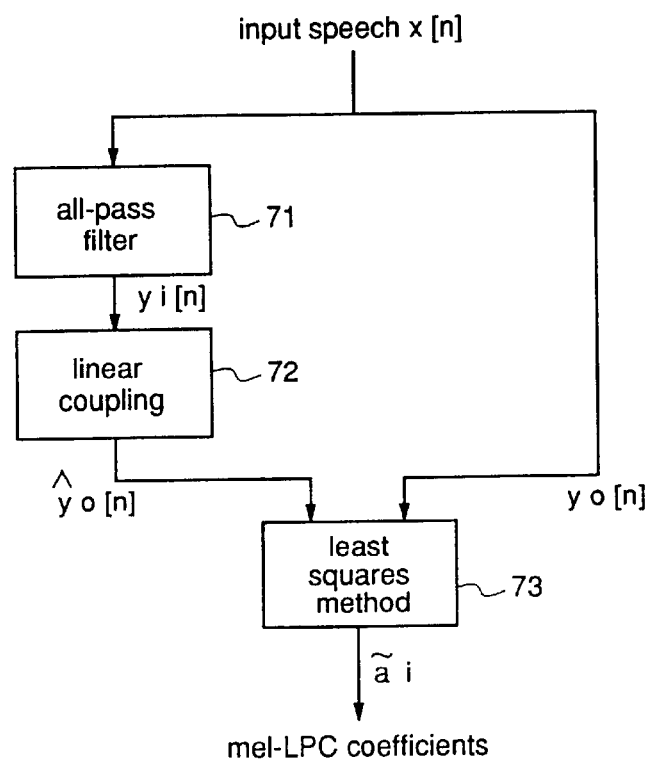
FIG. 8 is a block diagram illustrating the detailed construction of a mel-LPC analysis unit included in the speech recognition apparatus according to the second embodiment.

FIG. 8 shows the procedure of the practical calculation for obtaining mel-LPC coefficients. This part is identical to that of the first embodiment shown in FIG. 3. In FIG. 8, reference numeral 71 designates multiple stages of all-pass filters for transforming an input signal into a frequency-warped signal. Reference numeral 72 designates a linear coupling unit for forming linear coupling between the output signals from the all-pass filters 71 and the predictive coefficients, and outputting the predictors of the input signal. Reference numeral 73 designates a least square operation unit for outputting mel-LPC coefficients by applying the method of least square to the predictors output from the linear coupling unit 72 and to the input signal.

Next, a description is given of a method for estimating LPC coefficients having different resolutions for different frequencies, i.e., mel-LPC coefficients, with reference to FIG. 8.

(Step 1)
An input signal x[n] is filtered using the i-th order all-pass filter 71 to obtain an output signal $y_i[n]$ as follows.

$$y_i[n] = \alpha \cdot (y_i[n-1] - y_{i-1}[n]) + y_{(i-1)}[n-1] (n=0, \ldots, N-1, i=1, \ldots, p) \quad (23)$$

wherein $y_0[n]=x[n]$.

(Step 2)
By performing product-sum operation between the input signal x[n] and the output signal $y_i[n]$ from each all-pass filter by the linear coupling unit 72 according to the following formula (24), a correlation function on the mel-frequency axis is obtained. In this case, since the mel-correlation function $\phi(i,j)$ depends only on a difference in number of stages of the all-pass filters $|i-j|$ because of the relation of formula (9), it can be calculated by a product-sum operation of N terms represented by the following formula (24), without any approximation by terminating the operation.

$$\phi(i, j) = \tilde{r}_w[i - j] = \sum_{n=0}^{N-1} x[n] \cdot y_{(i-j)}[n] \quad (24)$$

(Step 3)
In the least square operation unit 73, mel-LPC coefficients are obtained by solving the normal equation of formula (6) with the mel-correlation function $\phi(i,j)$, by a well-known algorithm, for example, Durbin's method.

In the cepstrum coefficient calculation unit 8, the mel-LPC coefficients $\tilde{a}_i$ thus obtained are transformed to cepstrum coefficients. The transformation method has already been known, and the detail of this method is given in, for example, "Digital Signal Processing for Audio and Speech Information, by Kiyohiro Sikano, Tetsu Nakamura, Siro Ise, Shokodo, pp. 10–16". In this method, the transformation may be performed by treating the mel-LPC coefficients in like manner as the standard LPC coefficients. As a result, cepstrum coefficients on the mel-frequency axis can be obtained.

In the speech recognition unit 9, similarities are obtained between the time series of the cepstrum coefficients thus calculated (hereinafter referred to as mel-LPC cepstrum coefficients) and the plural standard models of words or phonemes prepared in advance, and the word or phoneme having the highest similarity is recognized.

As for the standard model, there is a method called hidden Markov model (HMM) in which time series of parameters respectively corresponding to plural words to be recognized are represented as probabilistic transitions, and this method is well known and widely utilized (e.g., Seiichi Nakagawa "Speech Recognition by Probability Model", Edited by Electronics Information and Communication Society). To be specific, HMM is a method in which HMM models learn time series of parameters of phonemes or words which reflect differences among individuals, and recognition is performed by measuring how similar a speech is to the model in terms of a probability value. In this embodiment, the above-described time series of mel-LPC cepstrum coefficients is used as the time series of the parameter.

Further, as the standard model, a time series of a representative parameter, among the time series of parameters respectively corresponding to plural words or phonemes to be recognized, may be used. Or, a normalized time series of a parameter obtained by normalizing (warping) a time series of the parameter time-wise or frequency-wise may be used as the standard model. For example, there is DP matching (dynamic programming) as a method of normalization to an arbitrary length on time axis, and this method can normalize a time series of a temporal parameter according to a predetermined corresponding rule.

In this embodiment, any of the standard models maybe used with no problem because the time series of the above-described mel-LPC cepstrum coefficients can be used as the time series of parameters.

Although in this second embodiment recognition is performed using the mel-LPC cepstrum coefficients as the time series of parameters obtained from the input signal, it is possible to use, for speech recognition, the mel-PARCOR coefficients obtained from the mel-LPC coefficients by the well-known method similar to the method of obtaining PARCOR coefficients from standard LPC coefficients, or mel-LSP coefficients obtained from the mel-LPC coefficients by the well-known method similar to the method of obtaining LSP coefficients from the standard LPC coefficients. Further, the mel-LPC coefficients, mel-PARCOR coefficients, mel-LSP coefficients, and mel-LPC cepstrum coefficients, which are obtained by mel-LPC analysis, can be replaced with the LPC coefficients, PARCOR coefficients, LSP coefficients, and LPC cepstrum coefficients which are all obtained from the conventional LPC analysis, in various fields including not only speech recognition but speech synthesizing and speech encoding.

In this second embodiment, the mel-LPC analysis unit 7 obtains the LPC coefficients having different resolutions for different frequencies, i.e., the mel-LPC coefficients, from the input signal using the mel-LPC analysis. However, the unit 7 may obtain the coefficients by the same method as used for the first embodiment, which method comprises transforming the input signal into a frequency-warped signal using the all-pass filter, and subjecting the frequency-warped signal to standard LPC analysis to obtain the spectrum envelope.

As described above, in this second embodiment, parameters corresponding to a spectrum envelope having different resolutions for different frequencies based on human auditory characteristics are obtained by the mel-LPC analysis using a weighting function of frequency based on the human auditory characteristics. Therefore, it is possible to recognize the feature of the spectrum envelope efficiently even with smaller number of parameters, and application of these parameters to speech recognition realizes higher recognition performance with a smaller processing amount.

[Embodiment 3]

Figure 9:
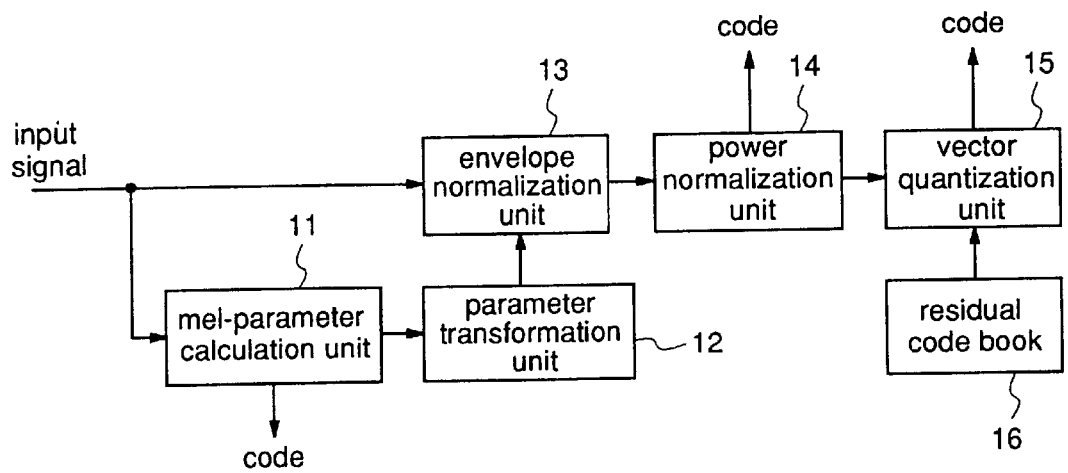
FIG. 9 is a block diagram illustrating the construction of an audio signal compression apparatus according to a third embodiment of the present invention.

FIG. 9 is a block diagram illustrating the construction of an audio signal compression apparatus according to a third embodiment of the present invention. The audio signal compression apparatus according to this third embodiment is used as a speech signal compression apparatus for compressing a narrow-band signal such as a speech signal. In the figure, reference numeral 11 designates a mel parameter calculation unit for obtaining mel-LPC coefficients from an input signal, frame by frame, by mel-LPC analysis including frequency warping in a prediction model, which mel-LPC coefficients represent a spectrum envelope having different resolutions for different frequencies. Reference numeral 12 designates a parameter transformation unit for transforming the mel-LPC coefficients on the mel-frequency axis obtained in the mel parameter calculation unit 1 into parameters representing a spectrum envelope like LPC coefficients on linear frequency axis. Reference numeral 13 designates an envelope normalization unit for normalizing the input audio signal by inversely filtering it with the parameter obtained in the parameter transformation unit 2 to calculate residual signals. Reference numeral 14 designates a power normalization unit for performing power normalization of the residual signals calculated in the envelope normalization unit 13, based on the maximum value or mean value of the power. Reference numeral 15 designates a vector quantization unit for vector quantizing the normalized residual signals, which have been normalized by the power normalization unit 14, according to a residual code book 16, to transform the residual signals into residual codes.

Next, the operation of the audio signal compression apparatus will be described. In the mel parameter calculation unit 11 a time series of an input digital audio signal such as a speech (hereinafter, referred to as an input signal or an input speech) is subjected to mel-LPC analysis including frequency warping in a prediction model, frame by frame, to obtain mel-LPC coefficients representing a spectrum envelope having different resolutions for different frequencies. The process of obtaining the mel-LPC coefficients representing a spectrum envelope is identical to the process described with respect to the mel-coefficient calculation unit 21 in the first embodiment, and parameters representing a spectrum envelope can be obtained in the same way.

Next, in the parameter transformation unit 12 the mel-LPC coefficients on the mel-frequency axis calculated by the mel parameter calculation unit 11 are transformed into parameters representing a spectrum envelope, such as LPC coefficients on linear frequency axis. This process is identical to that described in the first embodiment and, therefore, can be realized by means like the envelope calculation unit 22. When compressing a speech signal, a time series of an input speech signal is subjected to LPC analysis for each frame to obtain parameters representing LPC spectrum envelope components such as LPC coefficients, LSP coefficients, or PARCOR coefficients, and the input signal is normalized by inverse filtering with these parameters to calculate residual signals. Therefore, more efficient normalization and separation can be achieved when the inverse-filtering on the time axis and the separation into the spectrum envelope components and the residual signals are carried out by using the following coefficients: mel-LPC coefficients obtained from the input speech as in this third embodiment, mel-PARCOR coefficients obtained by the well-known method similar to the method of obtaining PARCOR coefficients from standard LPC, or mel-LSP coefficients obtained from mel-LPC coefficients in the well-known method similar to the method of obtaining LSP coefficients from standard LPC coefficients.

In the envelope normalization unit 13 inverse-filtering is carried out using the parameters representing a spectrum envelope such as the LPC coefficients on the linear frequency axis which are transformed by the parameter transformation unit 12 whereby the spectrum envelope components are normalized and the residual signals are calculated. Further, in the power normalization unit 14 the residual signals output from the envelope normalization unit 13 are subjected to power normalization based on the maximum value or mean value of the power.

In the vector quantization unit 15 the residual signals output from the power normalization unit 14 are vector-quantized using the residual code book 16 prepared in advance. As the result of the quantization, the vector quantization unit 15 outputs codes, thereby completing the compressive coding of the input signal.

As described above, according to the audio signal compression method and apparatus of this third embodiment, in the mel parameter calculation unit 11 the mel-LPC coefficients representing a spectrum envelope having different resolutions for different frequencies and based on human auditory characteristics are obtained from the frequency characteristic signal sequence calculated from the input audio signal. Then, in the parameter transformation unit 12 the mel-LPC coefficients are transformed to parameters representing a spectrum envelope such as LPC coefficients on linear frequency axis. Thereafter, in the envelope normalization unit 13, normalization is performed by inverse-filtering with the parameters obtained in the parameter transformation unit 12 to normalize the residual signals. Therefore, flattening of the frequency characteristic signal sequence can be performed precisely, resulting in more efficient quantization. Further, in the vector quantization, since the residual signals are represented using specified and limited information (codes), residual signals of simpler shape can be represented by less codes. In the present invention, since a spectrum envelope having different resolutions for different frequencies is used to simplify the shape of the residual signals, simplification of the shape of residual signals can be performed more precisely, resulting in efficient quantization.

[Embodiment 4]

Figure 10:
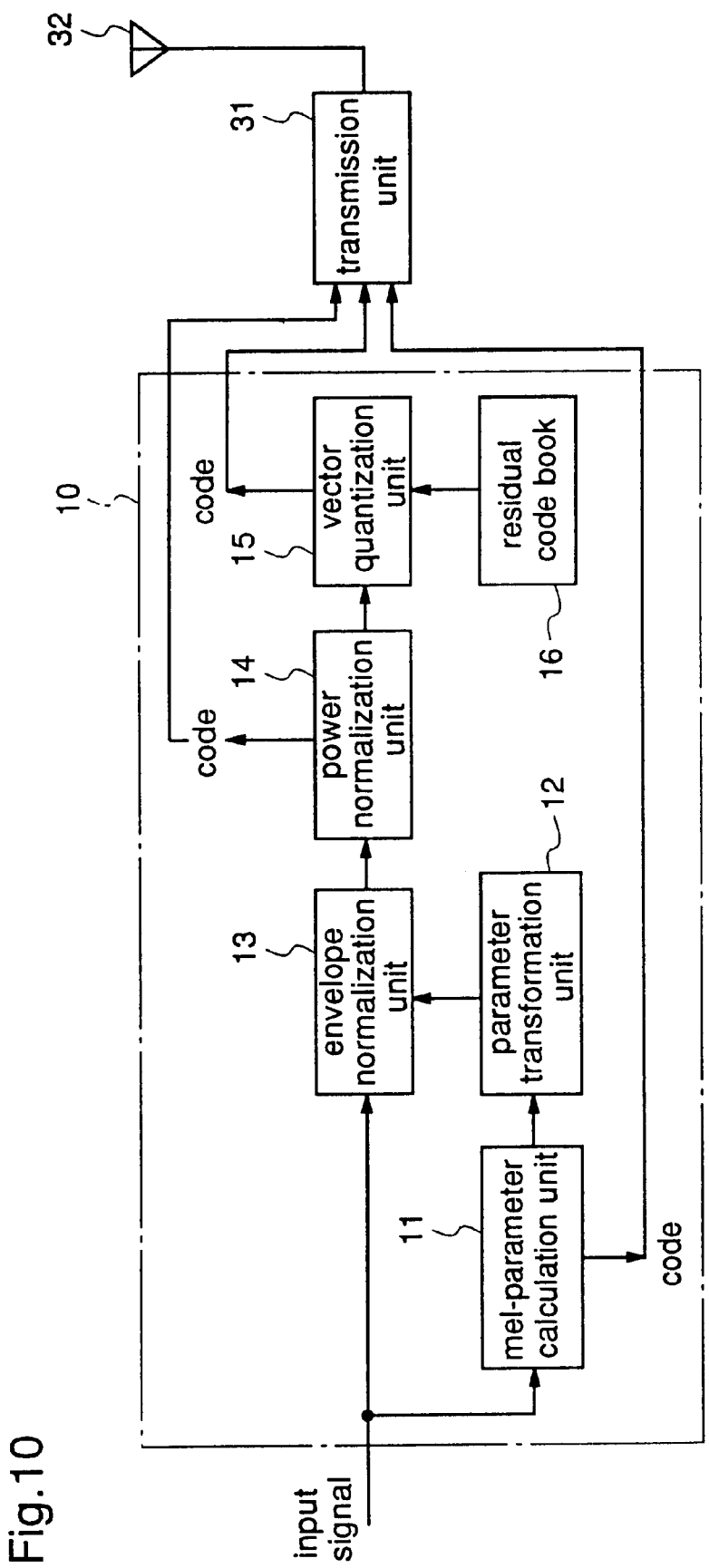
FIG. 10 is a block diagram illustrating the construction of a portable phone according to a fourth embodiment of the present invention.

FIG. 10 is a block diagram illustrating the structure of a portable telephone according to a fourth embodiment of the present invention. The portable telephone of this fourth embodiment performs signal compression using a speech signal compression apparatus mainly used for compressing a narrow-band signal, such as a speech, according to the third embodiment of the invention. In FIG. 10, reference numeral 11 designates a mel parameter calculation unit for obtaining mel-LPC coefficients from an input audio signal, frame by frame, by mel-LPC analysis including frequency warping in a prediction model, which mel-LPC coefficients represent a spectrum envelope having different resolutions for different frequencies. Reference numeral 12 designates a parameter transformation unit for transforming the mel-LPC coefficients on the mel-frequency axis obtained in the mel parameter calculation unit 11 into parameters representing a spectrum envelope like LPC coefficients on linear frequency axis. Reference numeral 13 designates an envelope normalization unit for normalizing the input audio signal by inversely filtering it with the parameters obtained in the parameter transformation unit 12 to calculate residual signals. Reference numeral 14 designates a power normalization unit for power-normalizing the residual signals calculated in the envelope normalization unit 13, using the maximum value or mean value of the power. Reference numeral 15 designates a vector quantization unit for vector quantizing the normalized residual signals, which have been normalized by the power normalization unit 14, according to a residual code book 16, to transform the residual signals into residual codes. A speech compression unit 10 comprises the mel-parameter calculation unit 11, the parameter transformation unit 12, the envelope normalization unit 13, the power normalization unit 14, the vector quantization unit 15, and the residual code book 16. The speech compression unit 10 performs information compression of an input speech signal supplied from a microphone or the like, using a weighting function of frequency based on human auditory characteristics. Reference numeral 31 designates an transmission unit for modulating codes, which have been subjected to information compression by the speech compression unit 10, to a high-frequency signal having a frequency and a modulation type adapted to the specification of the portable telephone. Reference numeral 32 designates an antenna for radiating the high-frequency signal from the transmission unit 31.

A description is given of the operation of the portable telephone. The operation of the speech compression unit 10 is identical to that of the speech compression apparatus of the third embodiment. That is, in the mel-parameter calculation unit 11, a time series of an input digital audio signal such as a speech (hereinafter, referred to as an input signal or an input speech) is subjected to mel-LPC analysis including frequency warping in a prediction model, frame by frame, to obtain mel-LPC coefficients representing a spectrum envelope having different resolutions for different frequencies. The process of obtaining the mel-LPC coefficients representing a spectrum envelope is identical to the process described with respect to the mel-coefficient calculation unit 21 of the first embodiment, and parameters representing a spectrum envelope can be obtained in the same way.

Next, in the parameter transformation unit 12, the mel-LPC coefficients on the mel-frequency axis calculated by the mel parameter calculation unit 11 are transformed into parameters representing a spectrum envelope, such as LPC coefficients on linear frequency axis. This process is identical to that described in the first embodiment and, therefore, can be realized by means like the envelope calculation unit 22. When compressing a speech signal, a time series of an input speech signal is subjected to LPC analysis for each frame to obtain parameters representing LPC spectrum envelope components such as LPC coefficients, LSP coefficients, or PARCOR coefficients, and the input signal is normalized by inverse-filtering using these parameters to calculate residual signals. Therefore, more efficient normalization and separation can be achieved when the inverse-filtering on the time axis and the separation into the spectrum envelope components and the residual signals are carried out by using the following coefficients: mel-LPC coefficients obtained from the input speech as in this third embodiment, mel-PARCOR coefficients obtained by the well-known method similar to the method of obtaining PARCOR coefficients from standard LPC, or mel-LSP coefficients obtained from mel-LPC coefficients in the well-known method similar to the method of obtaining LSP coefficients from standard LPC coefficients.

In the envelope normalization unit 13, inverse-filtering is carried out using the parameters representing a spectrum envelope such as the LPC coefficients on the linear frequency axis which are obtained in the parameter transformation unit 12, whereby the spectrum envelope components are normalized and the residual signals are calculated.

Further, in the power normalization unit 14 the residual signals output from the envelope normalization unit 13 are subjected to power normalization based on the maximum value or mean value of the power.

In the vector quantization unit 15, the residual signals output from the power normalization unit 14 are vector-quantized using the residual code book 16 prepared in advance. As the result of the quantization, the vector quantization unit 15 outputs codes, thereby completing the compressive coding of the input signal.

The codes of the speech signal, which have been subjected to compressive coding by the audio compression unit 10, are input to the transmission unit 31. In the transmission unit 31, the codes are transformed to a high-frequency signal having a frequency and a modulation type according to the specification of the portable telephone, and then transmitted through the antenna 32 toward the base station.

As described above, according to the portable telephone of this fourth embodiment, in the mel parameter calculation unit 1, the mel-LPC coefficients representing a spectrum envelope having different resolutions for different frequencies and based on human auditory characteristics are obtained from the frequency characteristic signal sequence calculated from the input audio signal. Then, in the parameter transformation unit 2, the mel-LPC coefficients are transformed to parameters representing a spectrum envelope such as LPC coefficients on linear frequency axis. Thereafter, in the envelope normalization unit 3, normalization is performed by inverse-filtering with the parameters obtained in the parameter conversion unit 2 to normalize the residual signals. Therefore, flattening of the frequency characteristic signal sequence can be performed precisely, resulting in more efficient quantization. Further, in the vector quantization, since the residual signals are represented using specified and limited information (codes), residual signals of simpler shape can be represented by less codes. In the present invention, since a spectrum envelope having different resolutions for different frequencies is used to simplify the shape of the residual signals, simplification of the shape of residual signals can be performed more precisely, resulting in efficient quantization.

Therefore, the speech communication quality of the portable telephone according to this fourth embodiment is improved as compared with the conventional portable telephone if they use the same frequency band. If the desired speech communication quality is as high as that of the conventional one, the channel number can be increased.

This fourth embodiment of the invention can be applied to a mobile telephone system like an automobile telephone as well as the portable telephone.

[Embodiment 5]

Figure 11:
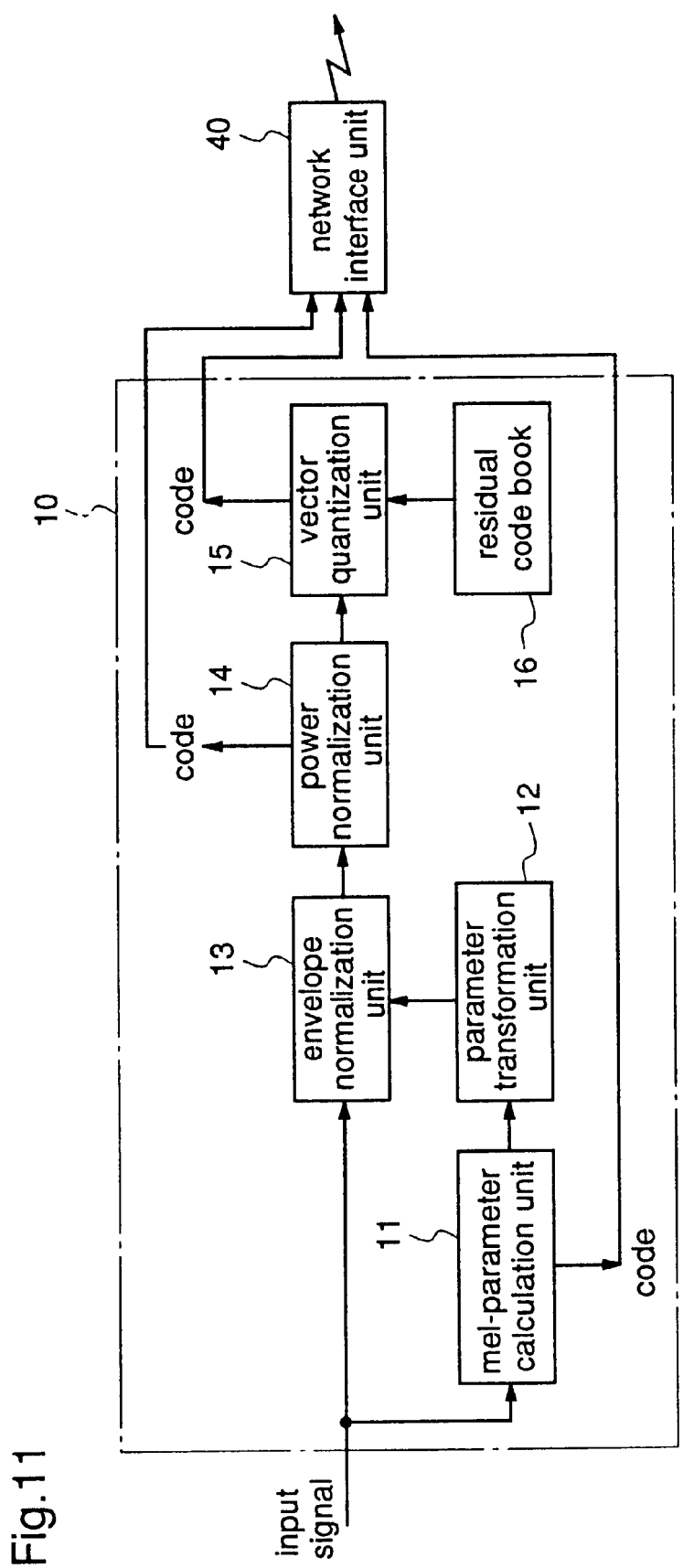
FIG. 11 is a block diagram illustrating the construction of a network equipment according to a fifth embodiment of the present invention.

FIG. 11 is a block diagram illustrating the structure of a network equipment according to a fifth embodiment of the present invention. The network equipment of this fifth embodiment is assumed to be an internet equipment which performs signal compression using a speech signal compression apparatus mainly used for compressing a narrow-band signal, such as a speech, according to the third embodiment of the invention, and then sends the compressed speech signal through a network such as internet to another network equipment. In FIG. 11, reference numeral 11 designates a mel parameter calculation unit for obtaining mel-LPC coefficients from an input audio signal, frame by frame, by mel-LPC analysis including frequency warping in a prediction model, which mel-LPC coefficients represent a spectrum envelope having different resolutions for different frequencies. Reference numeral 12 designates a parameter transformation unit for transforming the mel-LPC coefficients on the mel-frequency axis obtained in the mel parameter calculation unit 11 into parameters representing a spectrum envelope like LPC coefficients on linear frequency axis. Reference numeral 13 designates an envelope normalization unit for normalizing the input audio signal by inversely filtering it with the parameter obtained in the parameter transformation unit 12 to calculate residual signals. Reference numeral 14 designates a power normalization unit for performing power normalization of the residual signals calculated in the envelope normalization unit 13, using the maximum value or mean value of the power. Reference numeral 15 designates a vector quantization unit for vector-quantizing the normalized residual signals, which have been normalized by the power normalization unit 14 according to a residual code book 16, to transform the residual signals into residual codes. A speech compression unit 10 comprises the mel-parameter calculation unit 11, the parameter transformation unit 12, the envelope normalization unit 13, the power normalization unit 14, the vector quantization unit 15, and the residual code book 16. The speech compression unit 10 performs information compression of an input speech signal supplied from a microphone or the like, using a weighting function of frequency based on human auditory characteristics. Reference numeral 40 designates a network interface unit for transforming codes, which have been subjected to information compression by the speech compression unit 10, to codes for transmission of speech data in a network, and transmitting the codes according to a protocol adapted to the specification of the network, such as TCP/IP protocol.

A description is given of the operation of the network equipment. The operation of the speech compression unit 10 is identical to that of the speech compression apparatus of the third embodiment. That is, in the mel-parameter calculation unit 11, a time series of an input digital audio signal such as a speech (hereinafter, referred to as an input signal or an input speech) is subjected to mel-LPC analysis including frequency warping in a prediction model, frame by frame, to obtain mel-LPC coefficients representing a spectrum envelope having different resolutions for different frequencies. The process of obtaining the mel-LPC coefficients representing a spectrum envelope is identical to the process described with respect to the mel-coefficient calculation unit 21 of the first embodiment, and parameters representing a spectrum envelope can be obtained in the same way.

Next, in the parameter transformation unit 12, the mel-LPC coefficients on the mel-frequency axis calculated by the mel parameter calculation unit 11 are transformed into parameters representing a spectrum envelope, such as LPC coefficients on linear frequency axis. This process is identical to that described in the first embodiment and, therefore, can be realized by means like the envelope calculation unit 22. When compressing a speech signal, a time series of an input speech signal is subjected to LPC analysis for each frame to obtain parameters representing LPC spectrum envelope components such as LPC coefficients, LSP coefficients, or PARCOR coefficients, and the input signal is normalized by inverse-filtering using these parameters to calculate residual signals. Therefore, more efficient normalization and separation can be achieved when the inverse-filtering on the time axis and the separation into the spectrum envelope components and the residual signals are carried out by using the following coefficients: mel-LPC coefficients obtained from the input speech as in the third embodiment, mel-PARCOR coefficients obtained by the well-known method similar to the method of obtaining PARCOR coefficients from standard LPC, or mel-LSP coefficients obtained from mel-LPC coefficients in the well-known method similar to the method of obtaining LSP coefficients from standard LPC coefficients.

In the envelope normalization unit 13, inverse-filtering is carried out using the parameters representing a spectrum envelope such as the LPC coefficients on the linear frequency axis which are obtained in the parameter transformation unit 12, whereby the spectrum envelope components are normalized and the residual signals are calculated.

Further, in the power normalization unit 14, the residual signals output from the envelope normalization unit 13 are subjected to power normalization based on the maximum value or mean value of the power.

In the vector quantization unit 15, the residual signals output from the power normalization unit 14 are vector-quantized using the residual code book 16 prepared in advance. As the result of the quantization, the vector quantization unit 15 outputs codes, thereby completing the compressive coding of the input signal.

The codes of the speech signal, which have been subjected to compressive coding in the audio compression unit 10, are input to the network interface unit 40. In the network interface unit 40, the codes are transformed to codes for transmission of speech data in a network, and then transmitted toward the network according to a protocol adapted to the specification of the network, such as TCP/IP protocol.

As described above, according to the network equipment of this fifth embodiment, in the mel parameter calculation unit 11, the mel-LPC coefficients representing a spectrum envelope having different resolutions for different frequencies and based on human auditory characteristics are obtained from the frequency characteristic signal sequence calculated from the input audio signal. Then, in the parameter transformation unit 12, the mel-LPC coefficients are transformed to parameters representing a spectrum envelope such as LPC coefficients on linear frequency axis. Thereafter, in the envelope normalization unit 13, normalization is performed by inverse-filtering with the parameters obtained in the parameter transformation unit 12 to normalize the residual signals. Therefore, flattening of the frequency characteristic signal sequence can be performed precisely, resulting in more efficient quantization. Further, in the vector quantization, since the residual signals are represented using specified and limited information (codes), residual signals of simpler shape can be represented by less codes. In the present invention, since a spectrum envelope having different resolutions for different frequencies is used to simplify the shape of the residual signals, simplification of the shape of residual signals can be performed more precisely, resulting in efficient quantization.

Therefore, the speech communication quality of the network equipment according to this fifth embodiment is improved as compared with the conventional one if the networks have the same data transmission speed. If the desired speech communication quality is as high as that of the conventional one, the network equipment of this fifth embodiment can contain more terminals.

Although this fifth embodiment is applied to internet equipment such as a personal computer, an internet telephone, and an internet television, it may be applied to a terminal unit using a protocol other than internet, such as personal computer communication.

[Embodiment 6]

Figure 12:
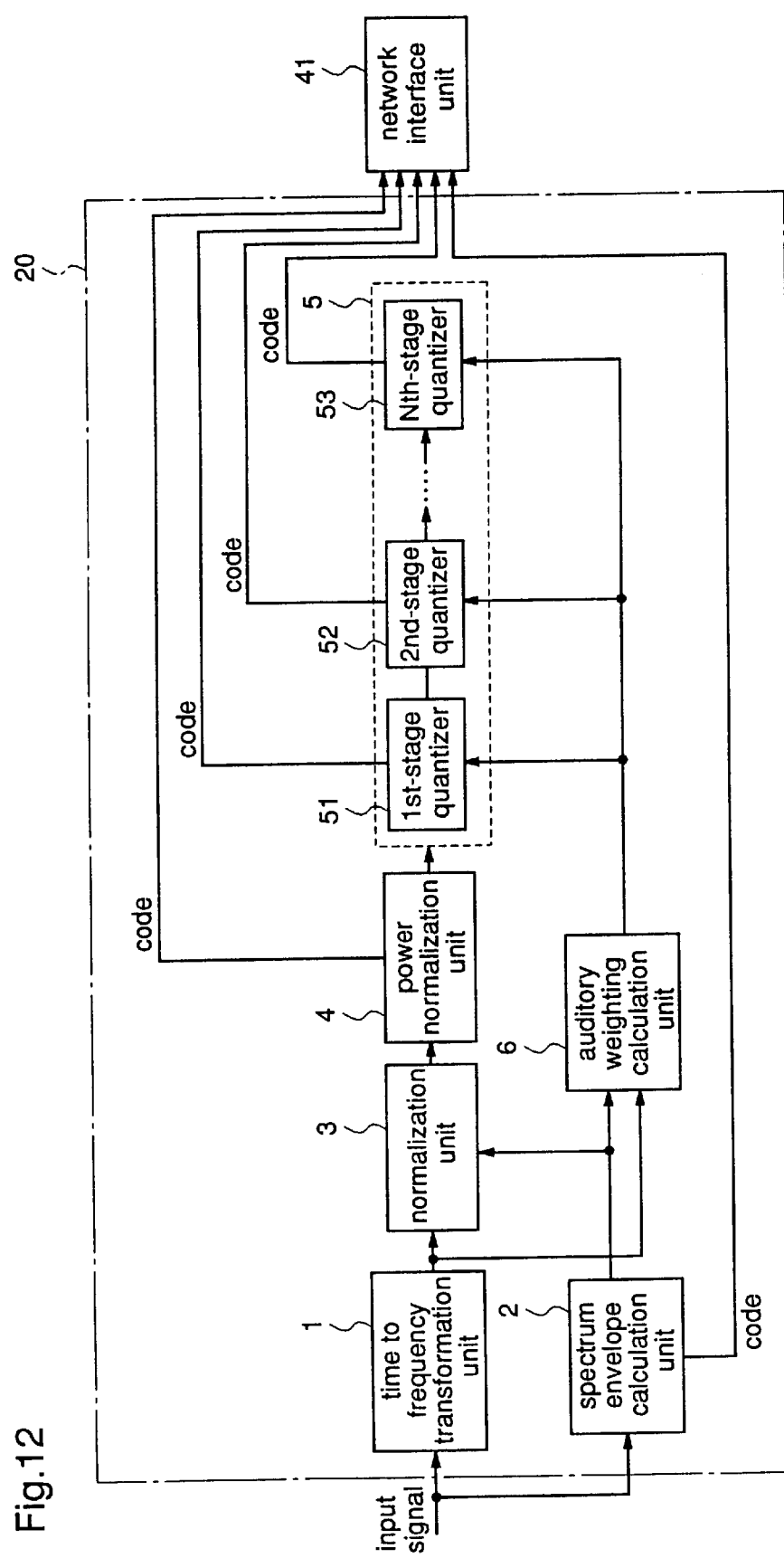
FIG. 12 is a block diagram illustrating the construction of a network equipment according to a sixth embodiment of the present invention.

FIG. 12 is a block diagram illustrating the structure of a network equipment according to a sixth embodiment of the present invention.

The network equipment of this sixth embodiment is assumed to be an internet equipment which performs signal compression using an audio signal compression apparatus mainly used for compressing an audio-band signal, and then sends the compressed audio signal through a network such as internet to another network equipment. In FIG. 12, reference numeral 1 designates a time to frequency transformation unit for transforming a time series of an input digital audio signal or speech signal into a frequency characteristic signal sequence for each length of a specific period (frame) by MDCT, FFT, or the like. Reference numeral 2 designates a spectrum envelope calculation unit for obtaining, for each frame, a spectrum envelope having different resolutions for different frequencies, from the input audio signal, using mel-LPC analysis including a frequency warping function for a prediction model. Reference numeral 3 designates a normalization unit for normalizing the frequency characteristic signal sequence calculated by the time to frequency transformation unit 1 by dividing it with the spectrum envelope obtained by the spectrum envelope calculation unit 2 to flatten the frequency characteristic. Reference numeral 4 designates a power normalization unit for subjecting the frequency characteristic signal sequence flattened by the normalization unit 3 to power normalization using the maximum value or mean value of the power. Reference numeral 5 designates a multi-stage quantization unit for vector-quantizing the frequency characteristic signal sequence flattened by the normalization unit 3 and the power normalization unit 4. The multi-stage quantization unit 5 comprises a first stage quantizer 51, a second-stage quantizer 52, . . . , an $N_{th}$-stage quantizer 53 connected in series. Reference numeral 6 designates an auditory weighting calculation unit for receiving the frequency characteristic signal sequence output from the time to frequency transformation unit 1, and the spectrum envelope obtained in the spectrum envelope calculation unit 2, and obtaining weighting coefficients used for the quantization in the quantization unit 5, based on human auditory characteristics. An audio signal compression unit 20 comprises the time to frequency transformation unit 1, the spectrum envelope calculation unit 2, the normalization unit 3, the power normalization unit 4, the quantization unit 5 and the auditory weighting calculation unit 6, and performs compression of the input audio or speech signal, using a weighting function of frequency based on human auditory characteristics. Reference numeral 41 designates a network interface unit for transforming codes, which have been subjected to information compression by the audio signal compression unit 20, to codes for transmission of speech data in a network, and transmitting the codes according to a protocol adapted to the specification of the network, such as TCP/IP protocol.

Next, the operation of the network equipment will be described. The operation of the audio signal compression unit 20 is identical to that of the audio signal compression apparatus according to the first embodiment. That is, a time series of an input digital audio signal (hereinafter referred to simply as an input signal) is transformed to a frequency characteristic signal sequence, for each length of a specific period (frame), in the time to frequency transformation unit 1 by MDCT, FFT, or the like.

Further, from the input signal, a spectrum envelope having different resolutions for different frequencies is obtained in the spectrum envelope calculation unit, frame by frame, using mel-LPC analysis including frequency warping in a prediction model.

In the normalization unit 3, the frequency characteristic signal sequence is flattened by dividing the calculated frequency characteristic signal sequence with the spectrum envelope for normalization. The frequency characteristic signal sequence flattened by the normalization unit 3 is subjected to power normalization in the power normalization unit 4, based on the maximum value or mean value of the power.

On the other hand, the frequency characteristic signal sequence output from the time to frequency transformation unit 1 and the spectrum envelope obtained in the spectrum envelope calculation unit 2 are input to the auditory weighting calculation unit 6. In the unit 6, characteristic signals of spectrum of the frequency characteristic signal sequence output from the time to frequency transformation unit 1 are calculated, based on human auditory characteristics such as minimum audible limit characteristics and auditory masking characteristics, and weighting coefficients used for quantization are obtained based on the characteristic signals and the spectrum envelope.

The residual signals output from the power normalization unit 4 are quantized in the first-stage quantizer 51 of the multi-stage quantization unit 5, using the weighting coefficients obtained by the auditory weighting calculation unit 6, and then the quantization error components obtained as the result of the quantization at the first-stage quantizer 51 are quantized in the second-stage quantizer 52, using the weighting coefficients obtained by the auditory weighting calculation unit 6. Thereafter, in each of the plural stages of quantizers, the quantization error components obtained by quantization in the previous stage are quantized. Each of the quantizers outputs codes as the result of quantization. When the quantization error components obtained by quantization in the (N−1)th-stage quantizer have been quantized in the Nth-stage quantizer 53 using the weighting coefficients obtained by the auditory weighting calculation unit 6, the compressive coding of the audio signal is completed.

The codes of the audio signal, which have been subjected to compressive coding in the audio signal compression unit 20, are input to the network interface unit 41. In the network interface unit 41, the codes are transformed to codes for transmission of audio data in a network, and then transmitted toward the network according to a protocol adapted to the specification of the network, such as TCP/IP protocol.

As described above, according to the network equipment of this sixth embodiment, the normalization unit 3 normalizes a frequency characteristic signal sequence calculated from an input audio signal, using a spectrum envelope having different resolutions for different frequencies and based on human auditory characteristics. Therefore, the frequency characteristic signal sequence can be flattened with precision, resulting in efficient quantization.

Further, the burden on the vector quantization in the multi-stage quantization unit 5 is reduced, resulting in efficient quantization. Since the frequency characteristic signal sequence is represented by limited information (codes) in the vector quantization, the frequency characteristic signal sequence having a simpler shape can be represented with less codes.

Therefore, in the present invention, in order to simplify the shape of the frequency characteristic signal sequence, normalization is performed using the spectrum envelope which represents the schematic shape of the frequency characteristic signal sequence. Moreover, since the spectrum envelope having different resolutions for different frequencies is used as the schematic shape, the shape of the frequency characteristic signal sequence can be simplified more precisely, resulting in efficient quantization.

Furthermore, the vector quantizers 51~53 of the multi-stage quantization unit 5 perform vector quantization using, as weights for quantization, the weighting coefficients on frequency which are calculated by the auditory weighting calculation unit 6, based on the spectrum of the input audio signal, human auditory characteristics, and the spectrum envelope having different resolutions for different frequencies and based on human auditory characteristics. Therefore, efficient quantization can be performed utilizing human auditory characteristics.

Therefore, the speech communication quality of the network equipment according to this sixth embodiment is improved as compared with the conventional one if the networks have the same data transmission speed. If the desired speech communication quality is as high as that of the conventional one, the network equipment of this sixth embodiment can contain more terminals.

Although this sixth embodiment is applied to internet equipment such as a personal computer, an internet telephone, and an internet television, it may be applied to a terminal unit using a protocol other than internet, such as personal computer communication.

What is claimed is:

1. An audio signal compression method for compressively coding an input audio signal, including the steps of:
    calculating a spectrum envelope having different resolutions for different frequencies, from the input audio signal, using a weighting function on frequency based on human auditory characteristics; and
    flattening the input audio signal for each frame using the calculated spectrum envelope.

2. The method of claim 1 wherein the spectrum envelope having different resolutions for different frequencies is calculated by using a bark-frequency scale as the weighting function on frequency based on human auditory characteristics.

3. The method of claim 1 wherein the spectrum envelope having different resolutions for different frequencies is calculated by using a mel-frequency scale as the weighting function on frequency based on human auditory characteristics.

4. An audio signal compression method for compressively coding an input audio signal, including the steps of:
    transforming the input signal into a frequency-warped signal with an all-pass filter, using a weighting function on frequency based on human auditory characteristics;
    obtaining a spectrum envelope having different resolutions for different frequencies, by performing linear predictive analysis of the frequency-warped signal; and
    flattening the input audio signal for each frame using the spectrum envelope.

5. An audio signal compression method for compressively coding an input audio signal, including the steps of:
    performing mel-linear predictive analysis including frequency warping in a prediction model, thereby obtaining a spectrum envelope having different resolutions for different frequencies, from the input audio signal, using a weighting function on frequency based on human auditory characteristics; and
    flattening the input audio signal for each frame using the spectrum envelope.

6. An audio signal compression method for compressively coding an input audio signal, said method having the step of performing mel-linear predictive analysis including frequency warping in a prediction model, thereby calculating a spectrum envelope having different resolutions for different frequencies, from the input audio signal, using a weighting function on frequency based on human auditory characteristics; and
    said mel-linear predictive analysis comprising the steps of:
        cutting out an input signal of a specific time length from the input audio signal, and filtering the signal of the time length using multiple stages of all-pass filters to obtain output signals from the respective filters;
        obtaining an autocorrelation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i,j)$ is the autocorrelation function, $x[n]$ is the input signal, and $y_{(i-j)}[n]$ is the output signal from each filter;
        obtaining mel-linear predictive coefficients from the autocorrelation function on the mel-frequency axis; and
        using the mel-linear predictive coefficients as a spectrum envelope, or obtaining a spectrum envelope from the mel-linear predictive coefficients.

7. The method of claim 6 wherein said all-pass filters are first order all-pass filters for transforming a signal on the linear frequency axis to a signal on the mel-frequency axis by frequency transformation.

8. An audio signal compression apparatus for compressively coding an input audio signal, comprising:
   time-to-frequency transformation means for transforming the input audio signal to a frequency domain signal;
   spectrum envelope calculation means for calculating a spectrum envelope having different resolutions for different frequencies, from the input audio signal, using a weighting function on frequency based on human auditory characteristics;
   normalization means for normalizing the frequency domain signal using the spectrum envelope to obtain a residual signal;
   power normalization means for normalizing the residual signal by the power;
   auditory weighting calculation means for calculating weighting coefficients on frequency, based on the spectrum of the input audio signal and human auditory characteristics; and
   multi-stage quantization means having plural stages of vector quantizers connected in series, to which the normalized residual signal is input, and at least one of the vector quantizers quantizing the residual signal using the weighting coefficients.

9. The apparatus of claim 8 wherein said spectrum envelope calculation means obtains a frequency-warped signal by transforming the input audio signal into the frequency-warped signal using an all-pass filter, and obtains a spectrum envelope having different resolutions for different frequencies by subjecting the frequency-warped signal to linear predictive analysis.

10. The apparatus of claim 8 wherein said spectrum envelope calculating means obtains a spectrum envelope having different resolutions for different frequencies, from the input audio signal, using mel-linear predictive analysis including frequency warping in a prediction model.

11. The apparatus of claim 8 wherein said spectrum envelope calculating means obtains the spectrum envelope according to the following steps:
   cutting out an input signal of a specific time length from the input audio signal, and filtering the signal of the time length using multiple stages of all-pass filters to obtain output signals from the respective filters;
   obtaining an autocorrelation function on a mel-frequency axis by performing a product-sum operation between the input signal and the output signal from each filter, which product-sum operation is performed within a range restricted to the time length of the input signal as represented by the following formula, $$\varphi(i, j) = \sum_{n=0}^{N-1} x[n] \cdot y_{(i-j)}[n]$$

wherein $\phi(i,j)$ is the autocorrelation function, $x[n]$ is the input signal, and $y_{(i-j)}[n]$ is the output signal from each filter;
   obtaining mel-linear predictive coefficients from the autocorrelation function on the mel-frequency axis; and
   using the mel-linear predictive coefficients as a spectrum envelope, or obtaining a spectrum envelope from the mel-linear predictive coefficients.

12. The apparatus of claim 11 wherein said all-pass filters are first order all-pass filters for transforming a signal on the linear frequency axis to a signal on the mel-frequency axis by frequency transformation.

13. The apparatus of claim 8 wherein at least two of the plural vector quantizers constituting the multi-stage quantization means perform quantization using the weighting coefficients obtained by the auditory weighting calculation means, and the auditory weighting calculation means calculates weighting coefficients for each of the vector quantizers.

14. The apparatus of claim 13 wherein said multi-stage quantization means comprises:
   a first-stage quantizer for quantizing the residual signal normalized by the power normalization means, using the spectrum envelope having different resolutions for different frequencies obtained in the spectrum envelope calculation means, as weighting coefficients in the respective frequency domains;
   a second-stage quantizer for quantizing a quantization error signal output from the first-stage quantizer, using weighting coefficients which are calculated according to the correlation between the spectrum envelope and the quantization error signal from the first-stage quantizer, as weighting coefficients in the respective frequency domains; and
   a third-stage quantizer for quantizing a quantization error signal output from the second-stage quantizer, using weighting coefficients obtained by adjusting the weighting coefficients which are calculated from the input signal transformed to the frequency domain signal and human auditory characteristics in the auditory weighting calculation means, based on the spectrum envelope, the quantization error signal from the second-stage quantizer, and the normalized residual signal, as weighting coefficients in the respective frequency domains.

15. An audio signal compression apparatus for compressively coding an input audio signal, comprising:
   mel-parameter calculation means for calculating mel-linear predictive coefficients on a mel-frequency axis which represents a spectrum envelope having different resolutions for different frequencies, from the input audio signal, using a weighting function on frequency based on human auditory characteristics;
   parameter transformation means for transforming the mel-linear predictive coefficients to parameters representing a spectrum envelope, such as linear predictive coefficients on a linear frequency axis;
   envelope normalization means for normalizing the input audio signal by inversely filtering it with the parameters representing the spectrum envelope, to obtain a residual signal;
   power normalization means for normalizing the residual signal using the maximum value or mean value of the power to obtain a normalized residual signal; and
   vector quantization means for vector-quantizing the normalized residual signal using a residual code book to transform the residual signal into residual codes.

16. The apparatus of claim 15 wherein said spectrum envelope calculation means obtains a frequency-warped signal by transforming the input audio signal into the frequency-warped signal using an all-pass filter, and obtains a spectrum envelope having different resolutions for different frequencies by subjecting the frequency-warped signal to linear predictive analysis.

17. The apparatus of claim 15 wherein said spectrum envelope calculation means obtains a spectrum envelope having different resolutions for different frequencies, from the input audio signal, using mel-linear predictive analysis including frequency warping in a prediction model.

18. The apparatus of claim 15 wherein said spectrum envelope calculating means obtains the spectrum envelope according to the following steps:

cutting out an input signal of a specific time length from the input audio signal, and filtering the signal of the time length using multiple stages of all-pass filters to obtain output signals from the respective filters;

obtaining an autocorrelation function on a mel-frequency axis by performing a product-sum operation between the input signal and the output signal from each filter, which product-sum operation is performed within a range restricted to the time length of the input signal as represented by the following formula, $$\varphi(i, j) = \sum_{n=0}^{N-1} x[n] \cdot y_{(i-j)}[n]$$

wherein $\phi(i,j)$ is the autocorrelation function, x[n] is the input signal, and $y_{(i-j)}[n]$ is the output signal from each filter;

obtaining mel-linear predictive coefficients from the autocorrelation function on the mel-frequency axis; and using the mel-linear predictive coefficients as a spectrum envelope, or obtaining a spectrum envelope from the mel-linear predictive coefficients.

19. The apparatus of claim 18 wherein said all-pass filters are first order all-pass filters for transforming a signal on the linear frequency axis to a signal on the mel-frequency axis by frequency transformation.

20. A speech signal compression method for compressively coding an input speech signal, said method having the step of performing mel-linear predictive analysis including frequency warping in a prediction model, thereby calculating a spectrum envelope having different resolutions for different frequencies, from the input speech signal, using a weighting function on frequency based on human auditory characteristics; and said mel-linear predictive analysis comprising the steps of:

cutting out an input signal of a specific time length from the input speech signal, and filtering the signal of the time length using multiple stages of all-pass filters to obtain output signals from the respective filters;

obtaining an autocorrelation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i,j)$ is the autocorrelation function, x [n] is the input signal, and $y_{(i-j)}[n]$ is the output signal from each filter;

obtaining mel-linear predictive coefficients from the autocorrelation function on the mel-frequency axis; and using the mel-linear predictive coefficients as a spectrum envelope, or obtaining a spectrum envelope from the mel-linear predictive coefficients.

21. The method of claim 20 wherein said all-pass filters are first order all-pass filters for transforming a signal on the linear frequency axis to a signal on the mel-frequency axis by frequency transformation.

22. A speech signal compression apparatus for compressively coding an input audio signal, comprising:

mel-parameter calculation means for calculating mel-linear predictive coefficients on a mel-frequency axis which represents a spectrum envelope having different resolutions for different frequencies, from the input speech signal, using a weighting function on frequency based on human auditory characteristics;

parameter transformation means for transforming the mel-linear predictive coefficients to parameters representing a spectrum envelope, such as linear predictive coefficients on a linear frequency axis;

envelope normalization means for normalizing the input signal by inversely filtering it with the parameters representing the spectrum envelope, to obtain a residual signal;

power normalization means for normalizing the residual signal using the maximum value or mean value of the power to obtain a normalized residual signal; and vector quantization means for vector-quantizing the normalized residual signal using a residual code book to transform the residual signal into residual codes.

23. The apparatus of claim 22 wherein said spectrum envelope calculation means obtains a frequency-warped signal by transforming the input speech signal into the frequency-warped signal using an all-pass filter, and obtains a spectrum envelope having different resolutions for different frequencies by subjecting the frequency-warped signal to linear predictive analysis.

24. The apparatus of claim 22 wherein said spectrum envelope calculating means obtains a spectrum envelope having different resolutions for different frequencies, from the input speech signal, using mel-linear predictive analysis including frequency warping in a prediction model.

25. The apparatus of claim 22 wherein said spectrum envelope calculating means obtains the spectrum envelope according to the following steps:

cutting out an input signal of a specific time length from the input speech signal, and filtering the signal of the time length using multiple stages of all-pass filters to obtain output signals from the respective filters;

obtaining an autocorrelation function on a mel-frequency axis by performing a product-sum operation between the input signal and the output signal from each filter, which product-sum operation is performed within a range restricted to the time length of the input signal as represented by the following formula, $$\phi(i, j) = \sum_{n=0}^{N-1} x[n] \cdot y_{(i-j)}[n]$$

wherein $\phi(i,j)$ is the autocorrelation function, x[n] is the input signal, and $y_{(i-j)}[n]$ is the output signal from each filter;

obtaining mel-linear predictive coefficients from the autocorrelation function on the mel-frequency axis; and using the mel-linear predictive coefficients as a spectrum envelope, or obtaining a spectrum envelope from the mel-linear predictive coefficients.

26. The apparatus of claim 25 wherein said all-pass filters are first order all-pass filters for transforming a signal on the linear frequency axis to a signal on the mel-frequency axis by frequency transformation.

* * * * *